(12) United States Patent  
Zhang et al.

(10) Patent No.: US 7,633,192 B2  
(45) Date of Patent: Dec. 15, 2009

(54) SUPERCONDUCTING COIL SUPPORT STRUCTURES

(75) Inventors: Jiping Zhang, Winter Springs, FL (US); Robert J. Nelson, Orlando, FL (US); Peter J. Clayton, Casselberry, FL (US); William R. McCown, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 215 days.

(21) Appl. No.: 11/529,373

(22) Filed: Sep. 28, 2006

(65) Prior Publication Data

US 2008/0079323 A1 Apr. 3, 2008

(51) Int. Cl.  
*H02K 9/00* (2006.01)

(52) U.S. Cl. .............................. 310/52; 310/54; 310/261

(58) Field of Classification Search ............. 310/52–59, 310/64, 201, 208, 261  
See application file for complete search history.

(56) References Cited

U.S. PATENT DOCUMENTS

| | | | | |
|---|---|---|---|---|
| 4,085,343 A | * | 4/1978 | Hasegawa et al. | 310/52 |
| 4,184,089 A | * | 1/1980 | Sterrett et al. | 310/52 |
| 4,295,068 A | * | 10/1981 | Gamble | 310/52 |
| 4,649,303 A | * | 3/1987 | Hirao | 310/52 |
| 5,532,663 A | | 7/1996 | Herd et al. | |
| 5,548,168 A | | 8/1996 | Laskaris et al. | |
| 5,774,032 A | * | 6/1998 | Herd et al. | 335/216 |
| 6,376,943 B1 | * | 4/2002 | Gamble et al. | 310/52 |
| 6,597,082 B1 | * | 7/2003 | Howard et al. | 310/261 |
| 6,657,333 B2 | * | 12/2003 | Shoykhet et al. | 310/61 |
| 7,053,509 B2 | * | 5/2006 | Ryan et al. | 310/68 C |

\* cited by examiner

*Primary Examiner*—Thanh Lam

(57) ABSTRACT

Support structures (100) for attaching superconducting conductors (106) to a rotor (50) of an electrical machine (10). The support structures (100) are mechanically configured to transfer loads exerted on the superconducting conductors (106) during both normal and transient operation of the rotor (50). The mechanical configuration and material of the support structures (100) further present a thermal path that is longer than the physical distance between the superconducting conductors (106) and the rotor (50) thereby minimizing heat flow from the warm rotor (50) to the cold superconducting conductors (106).

10 Claims, 18 Drawing Sheets

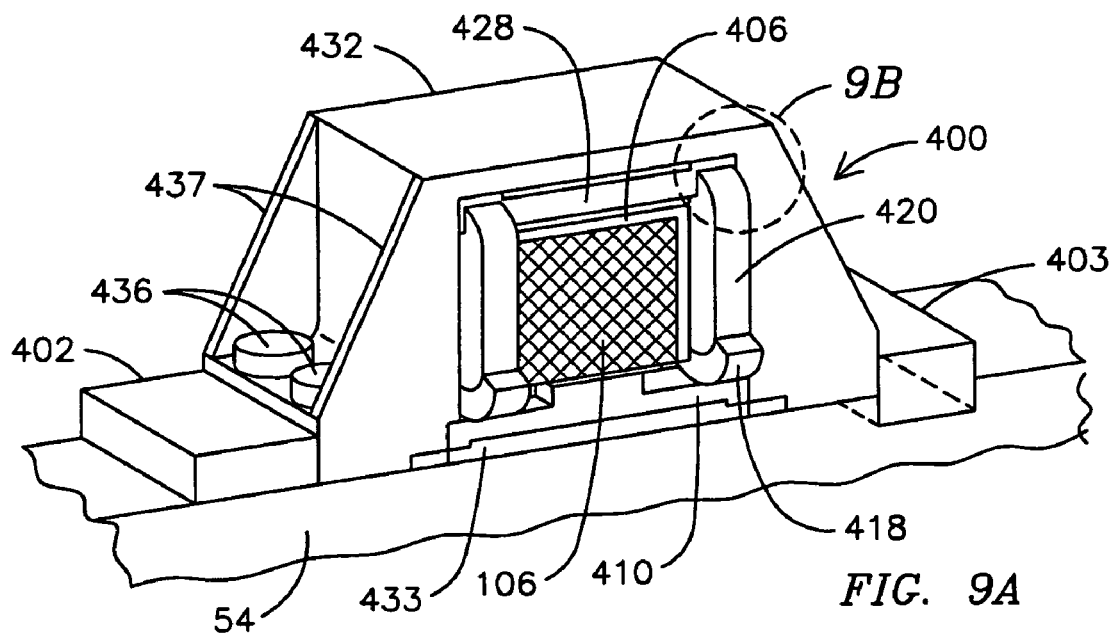
FIG. 9A
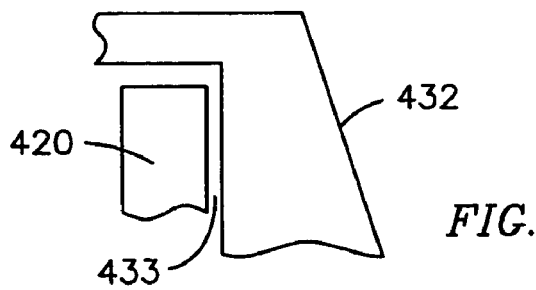
FIG. 9B
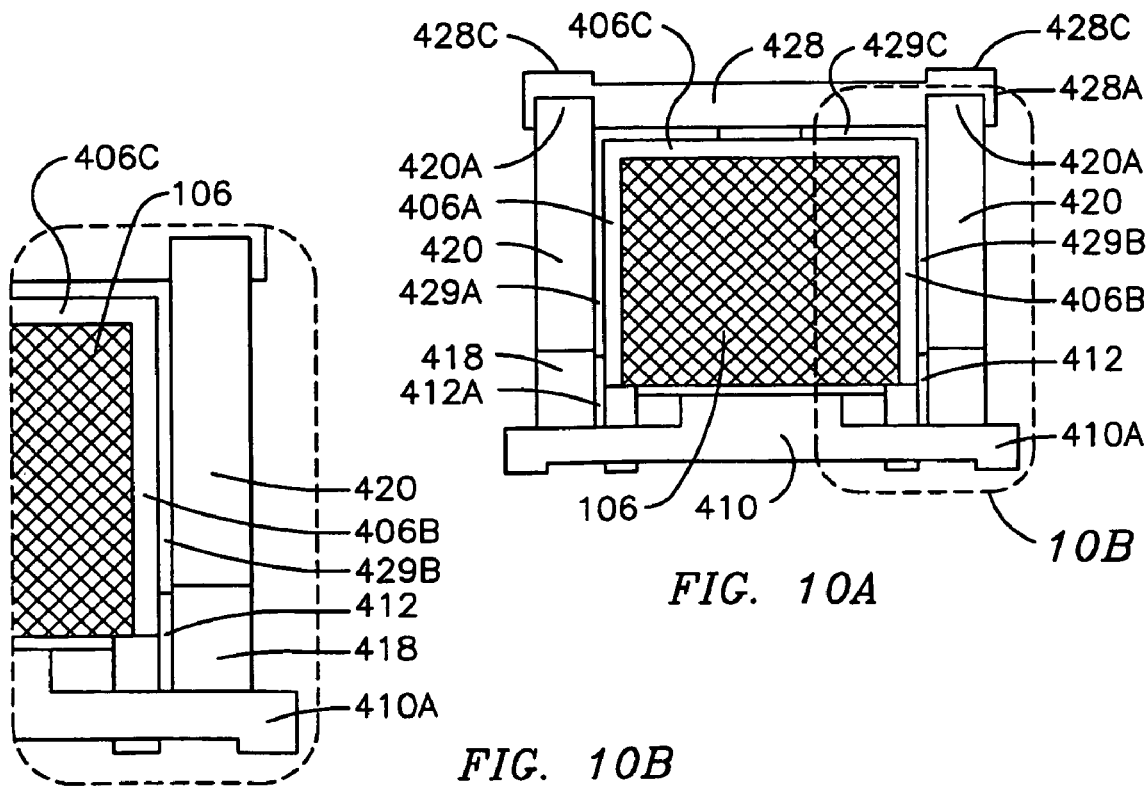
FIG. 10A
FIG. 10B

SUPERCONDUCTING COIL SUPPORT STRUCTURES

FIELD OF THE INVENTION

This invention relates in general to mechanical support structures and more particularly to mechanical support structures for supporting a superconducting coil of a dynamoelectric machine.

BACKGROUND OF THE INVENTION

An electric generator transforms rotational energy into electrical energy according to generator action principles of a dynamoelectric machine. The turning torque supplied to a rotating rotor by a combustion or steam-driven turbine is converted to alternating current (AC) electricity, typically three-phase AC, in a stationary stator that surrounds the rotor. The generator is a mechanically massive and electrically complex structure, supplying output power up to 1,500 MVA at voltages up to 26 kilovolts. Electrical generators are the primary power producers in an electrical power system.

As shown in FIG. 1, a conventional electric generator 10 comprises a substantially cylindrical rotor 12 supporting axial field windings or rotor windings 13. A direct current (DC) supplied to the rotor windings 13 produces a magnetic flux field that rotates as the rotor rotates within a stationary armature or stator 14. One end 15 of the rotor 12 is drivingly coupled to a steam or gas driven turbine (not shown in FIG. 1) for providing rotational energy to turn the rotor 12. The opposing end 16 is coupled to an exciter (not shown) for supplying the direct current to the rotor windings 13. An alternating current is generated in the stationary stator windings as the rotor's magnetic flux field crosses the stator windings. Rotor rotation subjects the rotor 12 and the rotor windings 13 to radial centrifugal forces that may result in radial distortion of these generator components.

The stator 14, a shell-like structure, encloses the rotor and comprises a core 17 further comprising a plurality of thin, high-permeability circumferential slotted laminations 17A placed in a side-by-side orientation and insulated from each other to reduce eddy current losses. Stator coils are wound within the inwardly directed slots. The AC electricity induced in the stator windings by action of the rotating magnetic field of the rotor 12 flows to terminals 19 mounted on the generator frame for connection to an external electrical load. Three-phase alternating current is produced by a generator comprising three independent stator windings spaced at 120° around the stator shell. Single-phase alternating current is supplied from a stator having a single stator winding.

The rotor 12 and the stator 14 are enclosed within a frame 20. Each rotor end comprises a bearing journal (not shown) for cooperating with bearings 30 attached to the frame 20. The rotor 12 further carries a blower 32 for forcing cooling fluid through the generator elements. The cooling fluid is retained within the generator 10 by seals 34 located where the rotor ends penetrate the frame 20. The generator 10 further comprises coolers 36 receiving and cooling the cooling fluid to release the heat absorbed from the generator components. The cooling fluid is then recirculated back through the generator elements.

Generator cooling system is required to remove heat energy produced by electrical losses resulting from the large currents flowing through the generator conductors, including the direct current flowing through the rotor windings 13 and the alternating current induced in the stator coils. Additional heat sources include mechanical losses, such as windage caused by the spinning rotor, and friction at the bearings 30.

In a dynamoelectric motor (including rotary motors and linear motors) the stator windings are responsive to an external electric current that generates a stator magnetic field. Interaction of the stator field with a rotor magnetic field produces motion (rotary or linear) of the rotor. In an exemplary embodiment the rotor comprises a magnetically-permeable solid material, such as an iron-core rotor, for producing the rotor magnetic field.

Copper is the material of choice for the rotor's conductive windings in both generators and motors. Although the electrical resistance of copper is low compared to most other conductive materials, current flow through the copper conductors causes substantial rotor heating, diminishing the machine's power efficiency and requiring use of a cooling system to maintain the rotor at an appropriate operating temperature.

To increase generator output and efficiency and reduce generator size and weight, superconducting rotor windings with effectively no resistance have been developed. These winding are commonly referred to as high-temperature superconducting (HTS) windings (distinguished from low temperature superconducting materials that achieve a superconducting state at a lower temperature). It is preferred to use high-temperature superconducting materials since their cooling requirements are less severe.

Superconductivity is a phenomenon observed in several metals and ceramic materials when the material is cooled to temperatures ranging from near absolute zero (0° K. or −273° C.) to a liquid nitrogen temperature of about 77° K. or −196° C. At these temperatures the metal and ceramics exhibit effectively no electrical resistance to current flow. The temperature at which the material's electrical resistance is substantially zero is referred to as the material's critical temperature (Tc). The critical temperature for aluminum is about 1.19° K. and for YBa2Cu3O7 (yttrium-barium-copper-oxide) is about 90° K. A high-temperature superconducting material is maintained at or below its critical temperature by cooling with either liquid helium or liquid nitrogen.

Since the superconducting materials exhibit substantially no electrical resistance when maintained at or below their critical temperature, these materials can carry a substantial electric current for a long duration with insignificant energy losses, including losses through the generation of heat.

Although the HTS rotor windings (coils) exhibit little resistance to current flow, they are sensitive to mechanical bending and tensile stresses that can cause premature degradation and winding failure (e.g., an open circuit). For example, it is necessary to form bends in the HTS rotor windings that circumscribe the core. Stresses are induced at these bends. Normal rotor torque, transient fault condition torques and transient magnetic fields induce additional stress forces in the rotor windings. Also, the HTS rotor winding may be subjected to over-speed forces during rotor balancing procedures at ambient temperature and occasional over-speed conditions at superconducting temperatures during power generation operation. These over-speed and fault conditions substantially increase the centrifugal force loads on the rotor coil windings beyond the loads experienced during normal operating conditions. These operating conditions must be considered in the design of the HTS rotor windings and their support structures.

Normal operation of an electrical generator involves literally thousands of start-up and shut-down cycles (i.e., cool-down cycles) over an operational lifetime of several years. The temperature excursions experienced during these operating cycles can lead to winding fatigue and must therefore be considered in the design of the HTS rotor windings.

To maintain the superconducting conductors at or below their critical temperature, coolant flow paths carrying coolant supplied from a cryogenic cooler are disposed adjacent or proximate the windings. Typical coolants comprise liquid helium, liquid nitrogen or liquid neon.

Maintaining the structural integrity of the superconducting rotor windings against static and dynamic loads presents a formidable challenge to the development of a high temperature superconducting generator. The HTS rotor windings must be adequately supported by a winding support system to withstand the forces, stresses, strains and cyclical loads of normal and fault condition generator operation described above. Moreover, the support system must ensure that the windings do not prematurely crack, fatigue or break. Finally, the coil support structure must insulate the "warm" rotor (typically operating at room temperature) from the cryogenically-cooled HTS superconducting windings to maintain the windings at or below their critical temperature.

BRIEF SUMMARY OF THE INVENTION

One embodiment of the invention comprises a structure for supporting superconducting conductors in a spaced-apart relation from a rotor core of an electrical machine. The structure comprises an enclosure comprising first and second opposing sidewalls and an upper surface enclosing the superconducting conductors, a casing attached to the core and comprising first and second opposing interior surfaces, the enclosure disposed within the casing, load transferring elements supported between the enclosure and the casing for transferring loads imposed on the superconducting conductors to the casing during operation of the electrical machine, wherein a first gap is defined in a first thermal path between the enclosure and the casing through the elements to impede heat flow from the rotor core to the superconducting conductors and wherein the first gap is substantially open during normal operation of the electrical machine to lengthen the first thermal path and tends to close during an operating transient for the electrical machine.

BRIEF DESCRIPTION OF THE DRAWINGS

The present invention can be more easily understood and the advantages and uses thereof more readily apparent when the following detailed description of the present invention is read in conjunction with the figures wherein:

FIGS. 9A, 9B, 10A, 10B and 11-13 illustrate various views of a superconducting coil support structure according to a third embodiment of the present invention.

In accordance with common practice, the various described features are not drawn to scale, but are drawn to emphasize specific features relevant to the invention. Like reference characters denote like elements throughout the figures and text.

DETAILED DESCRIPTION OF THE INVENTION

Before describing in detail exemplary methods and structures for supporting a superconducting winding (coil) in a dynamoelectric machine rotor according to the teachings of the present invention, it should be observed that the present invention resides primarily in a novel and non-obvious combination of elements and process steps. So as not to obscure the disclosure with details that will be readily apparent to those skilled in the art, certain conventional elements and steps have been presented with lesser detail, while the drawings and the specification describe other elements and steps pertinent to understanding the invention in greater detail.

The following embodiments are not intended to define limits as to the structure or method of the invention, but only to provide exemplary constructions. The embodiments are permissive rather than mandatory and illustrative rather than exhaustive.

First Embodiment

Figure 1:
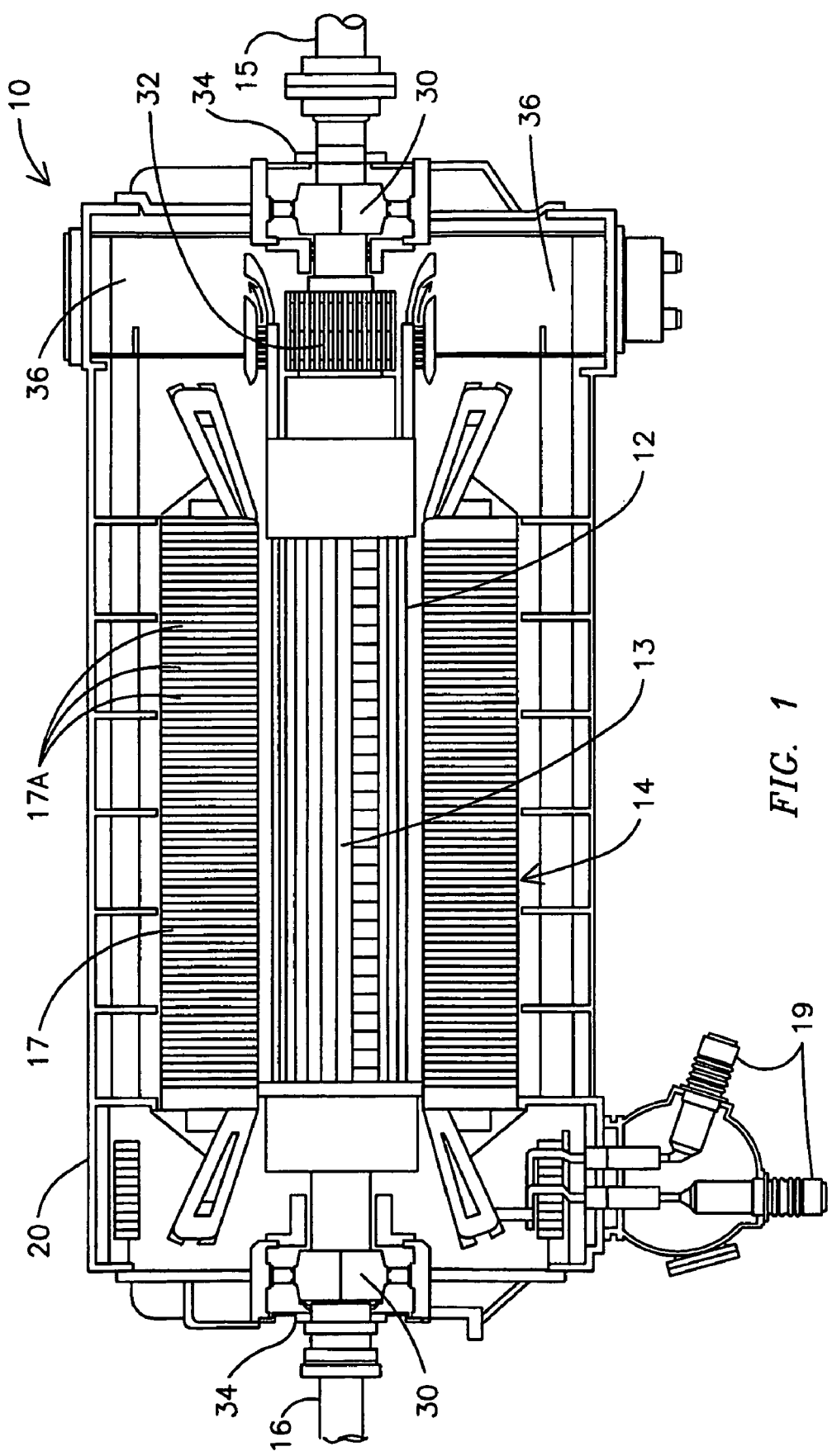
FIG. 1 is a cross-sectional view of a prior art electric generator.
Figure 2:
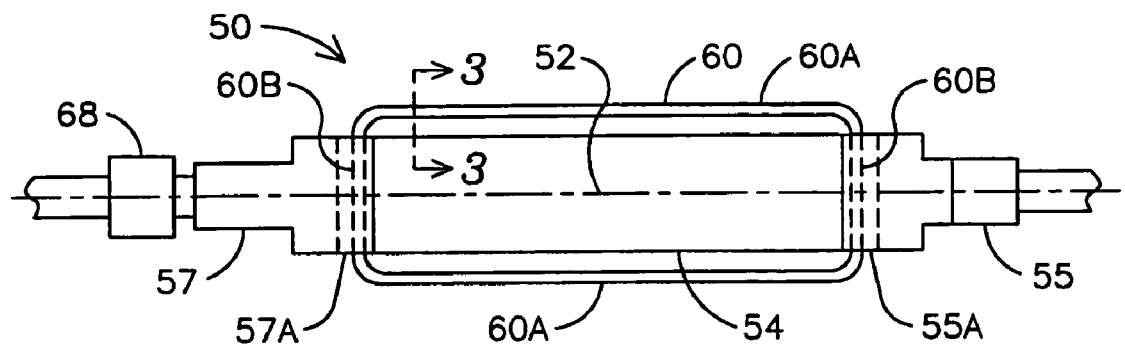
FIG. 2 is a pictorial illustration of a rotor for use in a superconducting dynamoelectric machine according to the teachings of the present invention.

Existing non-superconducting dynamoelectric machines, such as the electric generator 10 of FIG. 1, may be retrofitted by replacing the non-superconducting rotor 12 with a superconducting rotor 50 illustrated in FIG. 2. The superconducting rotor 50 defines a longitudinally-extending axis 52 and comprises a generally cylindrically-shaped core 54 and coaxially aligned rotor end segments 55 and 57 each attached to an end surface of the core 54. A material of the core 54 exhibits a high magnetic permeability, e.g. a ferromagnetic material such as iron.

The superconducting rotor 50 further comprises a generally longitudinally-extending, racetrack-shaped superconducting coil or winding 60 comprising generally linear axial segments 60A connected by radial segments 60B, the latter extending through openings 55A and 57A between end surfaces of the core 54 and the respective end segments 55 and 57. In certain embodiments a vacuum shield, not shown in FIG. 2, surrounds the superconducting coil 60 and attaches to the rotor 50.

Preferably, the superconducting rotor 50 of FIG. 2 comprises a rotor of an electric generator and the superconducting coil 60 comprises an electric generator field (rotor) winding. One of the end segments 55 or 57 includes a turbine coupling for connecting the rotor 50 to a prime mover for supplying rotational energy to the superconducting rotor 50 for generating electricity in the stator 14. In another embodiment, the superconducting rotor 50 comprises a rotor of a motor for producing rotational energy responsive to an electric field generated in a surrounding stator coil.

The end segment 57 further comprises a cryogenic transfer coupling 68. When the superconducting rotor 50 is rotating during operation of the dynamoelectric machine, the cryogenic transfer coupling 68, which comprises a stationary portion and a rotating portion (the individual portions not illustrated in FIG. 2), supplies cooling fluid (cryogenic fluid) from a cryogenic cooler (not shown) to closed coolant flow paths or channels in the superconducting coil 60 to maintain the superconducting coil 60 at or below its critical temperature. The coolant flows through the coolant channels, circulates back to the cryogenic cooler where the coolant temperature is reduced and returns to the coolant channels.

The required cooling capacity of the cryogenic cooler is directly related to the heat transferred from the "warm" rotor core 54 to the superconducting coil 60 during operation of the superconducting generator. Minimizing this heat transfer by judicious design of a superconducting coil support structure that supports the coil 60 during normal operation and transient conditions while minimizing heat transfer reduces the required cooler capacity and the energy consumed by the cooler to cool the cryogenic fluid.

In describing the various embodiments of the invention and their constituent elements below, certain of the drawings and descriptive text illustrate and describe the linear axial segments 60A of the superconducting coil 60. It is recognized that in certain embodiments a plurality of such segments 60A are disposed in a back-to-back orientation and supported by (attached to) the core 54 to form the superconducting coil 60. Additionally, although illustrated and described as relatively short segments herein for the purpose of describing the constituent elements, the teachings of the invention can be applied to superconducting coil segments of any length.

Figure 3A:
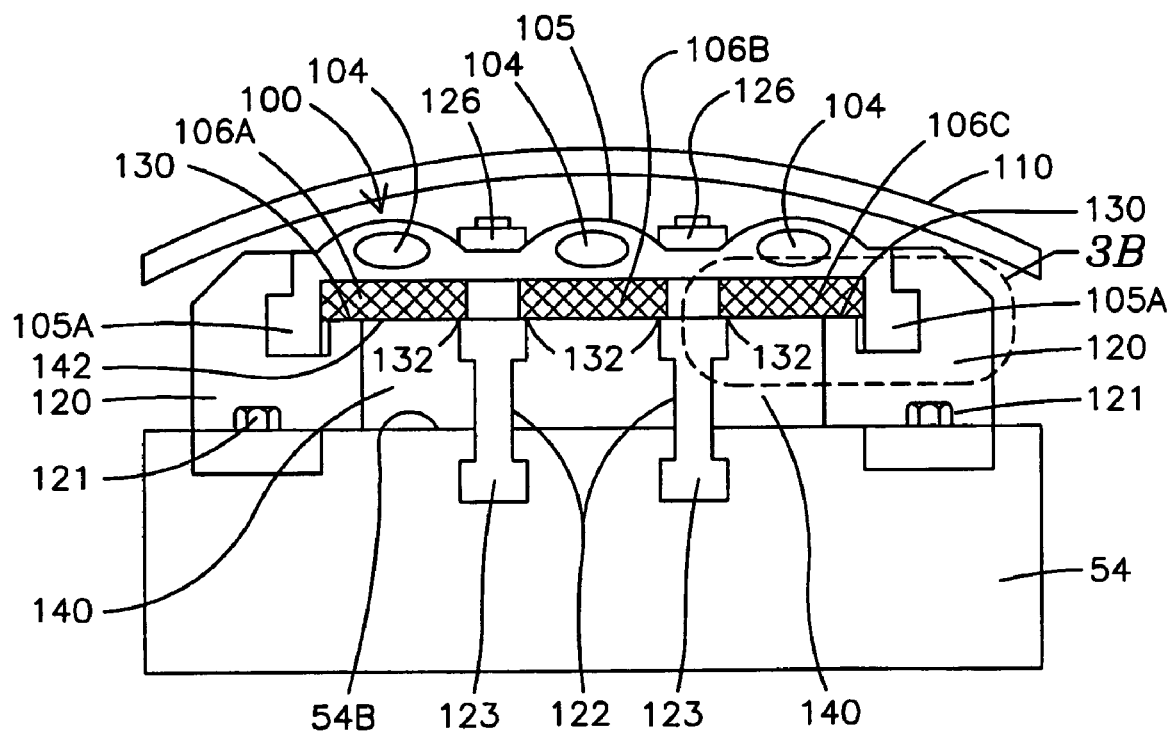
FIGS. 3A, 3B, 4, 5A, 5B, 5C and 6 illustrate various views of a superconducting coil support structure according to a first embodiment of the present invention.
Figure 3B:
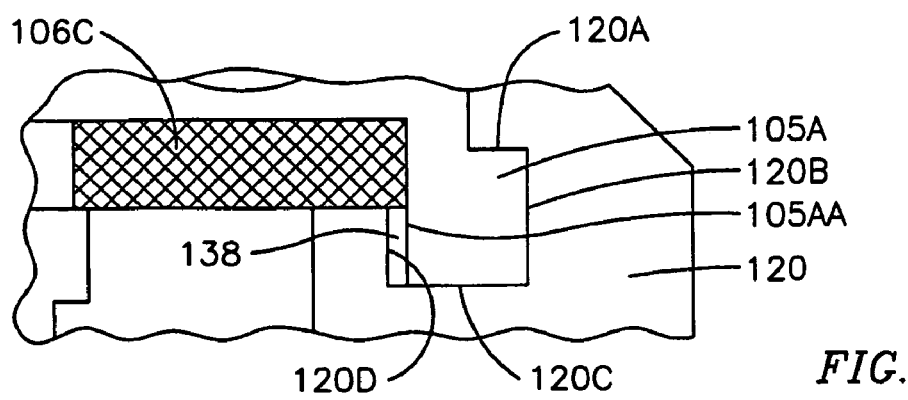
Figure 4:
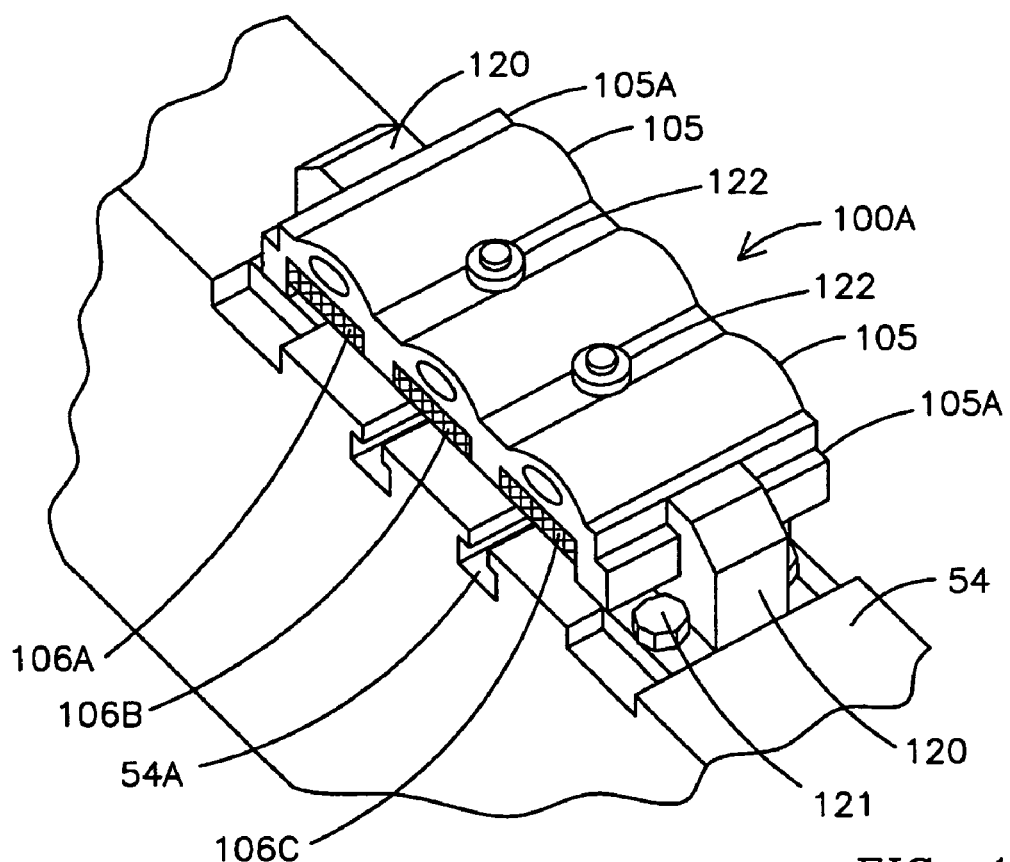

FIG. 3A is a cross-sectional view along a plane 3-3 of FIG. 2, illustrating a coil support structure 100 spaced apart from and supported by the rotor core 54. FIGS. 3B and 4 further illustrate the support structure 100. The coil support structure 100 comprises coolant flow paths or channels 104 disposed in a bracket 105. The bracket 105 (a material of the bracket comprises stainless steel or Inconel®) further supports superconducting conductor blocks (also referred to as superconducting blocks) 106A, 106B and 106C, each block comprising a plurality of superconducting filaments (the individual filaments are not illustrated in FIG. 3A nor in any other illustrated embodiments of the present invention).

In the embodiment of FIG. 3A each of the superconducting blocks 106A, 106B and 106C further comprises a plurality of elongated superconducting filament bars (formed from any of the known superconducting materials) each filament bar having a rectangular cross-sectional shape. A plurality of such bars (13 in one embodiment) are disposed in an adjacent configuration to form each superconducting conductor block 106A, 106B and 106C. Known adhesive materials and techniques are employed to retain the filaments and the bars in the desired configuration.

The elements of the coil support structure 100 support the superconducting conductor blocks 106A, 106B and 106C to withstand the normal static and dynamic loads and fault condition loads, while maintaining the blocks 106A, 106B and 106C at or below their critical temperature by thermally insulating the blocks from the warm rotor core 54, which typically operates at a temperature of about 350° K.

The superconducting blocks 106A, 106B and 106C are maintained at a temperature of about 30° K. by a coolant (typically liquid hydrogen) flowing through the coolant channels 104. The physical proximity of the channels 104 to the superconducting blocks 106A, 106B and 106C as illustrated in the cross-section of FIG. 3A, provides a relatively uniform temperature distribution along a width of each superconducting block.

The superconducting blocks 106A, 106B and 106C (although three superconducting blocks are illustrated in FIG. 3A, other embodiments may have more or fewer than three blocks) are supported by the bracket 105 along the length of the axial segments 60A (see FIG. 2). In one embodiment the bracket 105 also supports the radial segments 60B of FIG. 2. Since the coolant channels 104 are similarly supported by the bracket 105, the superconducting blocks 106A, 106B and 106C are maintained at a uniformly suitable temperature throughout their axial length.

The illustrated coolant flow channels 104 are elliptically shaped, however other cross-sectional shapes, such as a circle or a rectangle, are also suitable for carrying the cryogenic coolant. Other embodiments of the present invention include more or fewer than the three illustrated coolant flow paths.

The rotor 50, including the core 54 (see FIG. 2) and the superconducting support structure 100 and its constituent elements are enclosed within a non-magnetic vacuum enclosure 110 (see FIG. 3A) surrounding the rotor 50. Drawing a vacuum within the enclosure 110 reduces convective heat transfer from the warm rotor core to the windings of the superconducting coil 60. The vacuum enclosure 110 also beneficially protects the superconducting coil 60 and optimizes the rotor's magnetic flux.

As illustrated in FIGS. 3A and 4, the bracket 105 is supported by and spaced-apart from the core 54 by blocks 120 disposed at opposing lateral edges of the bracket 105. In one embodiment, each block 120 is rigidly affixed to the core 54 by a bolt 121 (typically a material of the bolt 121 comprises steel or another ferrous material) extending through an opening in the block 120 and threadably engaging a threaded opening in the core 54.

Each block 120 defines an inwardly-directed notch formed by surfaces 120A, 120B, 120C and 120D (see a close-up insert of FIG. 3B) for receiving an edge rib 105A of the bracket 105. The edge rib 105A is axially slidable within the notch to permit axial bracket movement, relative to the affixed block 120, responsive to material contraction forces induced by coolant flow through the coolant channels 104.

Intermediate the blocks 120, the bracket 105 is supported by bolts 122 (two illustrated in the exemplary embodiment of FIG. 3A) each having a radially-outward directed end affixed to the bracket 105 in a region between two adjacent superconducting blocks 106 and a radially-inward directed end slidably supported by the core 54. In one embodiment the radially-inward directed end of each bolt 122 comprises a T-shaped head 123 slidably received within a corresponding notch 54A (see FIG. 4) in the core 54. The notch 54A extends a length of the core 54 and thus the T-shaped head 123 is freely slidable axially therein to permit motion responsive to contraction forces induced by the coolant flow through the coolant channels 104.

The radially-outward directed end of each bolt 122, having threads formed thereon (the threads hidden from view in FIG. 3A), is received within a corresponding opening in the bracket 105 and is affixed thereto by threadably engaging a nut 126 to the bolt threads. Those skilled in the art recognize that other attachment techniques and elements can be used in lieu of the various bolt/nut and threaded bolt/threaded opening attachment techniques presented in conjunction with the various embodiments of the present invention.

As can be seen in FIG. 3A, the superconducting blocks 106A, 106B and 106C are supported within the bracket 105 (and proximate the coolant channels 104) by shoulder regions 130 of the blocks 120 and by shoulder regions 132 of the bolts 122. Other structural features for retaining the superconducting blocks 106A, 106B and 106C within the bracket 105 are known by those skilled in the art.

The physical relationship of the superconducting blocks 106A, 106B and 106C relative to the other elements of the coil support structure 100 allows the bracket 105 to restrain the superconducting blocks 106A, 106B and 106C against centrifugal forces produced during rotation of the rotor 50. These centrifugal loads imposed on the bracket 105 and the blocks 106A, 106B and 106C are transferred to the core 54 through the blocks 120 and the bolts 122. Tangential forces (lateral forces relative to the coil support structure 100 as illustrated in FIG. 3A), which are produced primarily during fault conditions, are absorbed by the blocks 120 and transferred to the core 54. Also, since the bracket 105 is axially slidable within the block notches and within the core notches 54A, the entire support structure 100 (except the blocks 120) is axially slidable relative to the core 54 to accommodate temperature-induced contraction of the bracket 105 (and its associated components) relative to the warmer core.

A gap 138, see the FIG. 3B, between the surface 120D of each of the two blocks 120 and an opposing surface 105AA of the bracket edge rib 105A permits thermal contraction of the bracket 105 along its width due to the cold temperatures induced by the cryogenic coolant flow through the coolant paths 104. Since the blocks 120 are affixed to the core 54, they maintain a temperature about equal to the rotor core temperature. The gap 138 is also closeable responsive to fault conditions that impose lateral loads on the components of the coil support structure 100, thereby preventing damage to the superconducting blocks 106A, 106B and 106C and the coolant flow channels 104.

The blocks 120 are affixed to the rotor core 54 by the bolts 121 and thus contact between the core 54 and the blocks 120 is limited to a region proximate the bolts 121. These contact areas are minimized to reduce heat flow from the warmer core 54 through the various support components to the colder bracket 105 and the superconducting blocks 106A, 106B and 106C.

The bolts 122 and blocks 120 are each formed from a material having a relatively high low-temperature strength and good thermal resistivity (i.e., a low thermal conductivity), such as a fiber-reinforced plastic (FRP) material. The FRP material resists heat flow from the warm rotor core 54 to the cold winding components and further transfers the centrifugal forces exerted on the winding components to the rotor core 54.

Certain FRP materials exhibit a tensile strength of about 1000 Mpa and thermal conductivity of about 0.37 W/mK (watts per meter length-temperature degree Kelvin) at 77° K. (compared to stainless steel exhibiting a thermal conductivity of about 0.6.5 W/mK). According to a preferred embodiment, a thermal barrier coating is applied to contact surfaces of the bracket 105, the bolts 121 and 122 and the rotor core 54 to further reduce heat transfer between components in physical contact.

Returning to FIG. 3A, with a vacuum drawn within the vacuum enclosure 110, there is little convective heat transfer through gaps 140 or gaps 138 (FIG. 3B). To reduce radiant heat transfer between the core 54 and the superconducting blocks 106, in one embodiment reflective material is disposed on a lower surface 142 of the blocks 106A, 106B and 106C and an opposing circumferential surface 54B of the core 54.

FIG. 4 illustrates a perspective view of a linear segment 100A of the coil support structure 100. Individual segments can be formed in any length such that the total number of bracket segments required to traverse the racetrack path around the core 54 (see FIG. 2) is dependent on the length of each bracket segment. In one embodiment, a single bracket segment extends the axial length of the rotor core 54.

Irrespective of the number of bracket segments, a plurality of blocks 120 are required to provide adequate support for the superconducting coil 60. Generally, the physical attributes of the blocks 120, including the number employed to support the coil 60, the spacing between adjacent blocks and the distance between the block openings that receive the bolts 121 is responsive to the current capacity of the rotor 50 and the anticipated operating and fault condition loads.

According to a thermal analysis conducted by the inventors, assuming a coolant temperature of about −240° C. and a rotor core temperature of about 30° C., the temperature distribution within the bracket 105 is relatively uniform due the thermal conductivity properties of the bracket material and the components supporting the superconducting blocks and the coolant flow paths. Therefore temperature gradients, and the mechanical stresses they can create, within the bracket 105 and within the superconducting blocks are minimal.

In one embodiment, the heat loss for one coil support structure segment 100A of FIG. 4 is about 3 watts. A total heat loss for a superconducting coil 60 comprising about eighty segments 100A is a few hundred watts (about 260 in one embodiment), which compares favorably to a loss of several hundred kilowatts in a copper rotor coil 13 (see FIG. 1) of a conventional electric generator.

The structural features of the coil support structure 100 as illustrated in FIGS. 3A, 3B and 4 provide easy serviceability of the superconducting coil 60 and its components.

Second Embodiment

Another embodiment of a coil support structure of the present invention (illustrated in FIGS. 5A, 5B, 5C and 6) comprises a compression support structure 200 (see FIG. 5A) for supporting the three exemplary parallel superconducting blocks 106A, 106B and 106C against lateral loads (tangential loads with respect to the rotor core). The compression support structure 200 comprises overhang frames 202 (constructed from a material having a high thermal resistance such as fiber reinforced plastic). Base regions 202A of the overhang frames 202 extending beyond side surfaces of a conductor enclosure 212 are attached to the rotor core 54 by any suitable fastening technique. In another embodiment the base regions 202A are attached to a casing structure (not shown) surrounding the compression support structure 200 and attached to the core 54. The shape of the illustrated overhang frame 202 is merely exemplary as the shape can be optimized in response to expected normal and fault condition loads.

The support structure 200 further comprises parallel brackets 208 (four brackets illustrated in FIG. 5A), each bracket 208 further comprising a plurality of successive inverted V-shaped members 208A. The overhang frame 202 engages an opening formed between adjacent V-shaped members 208A. In a preferred embodiment a material of the brackets 208 comprises stainless steel.

Figure 5A:
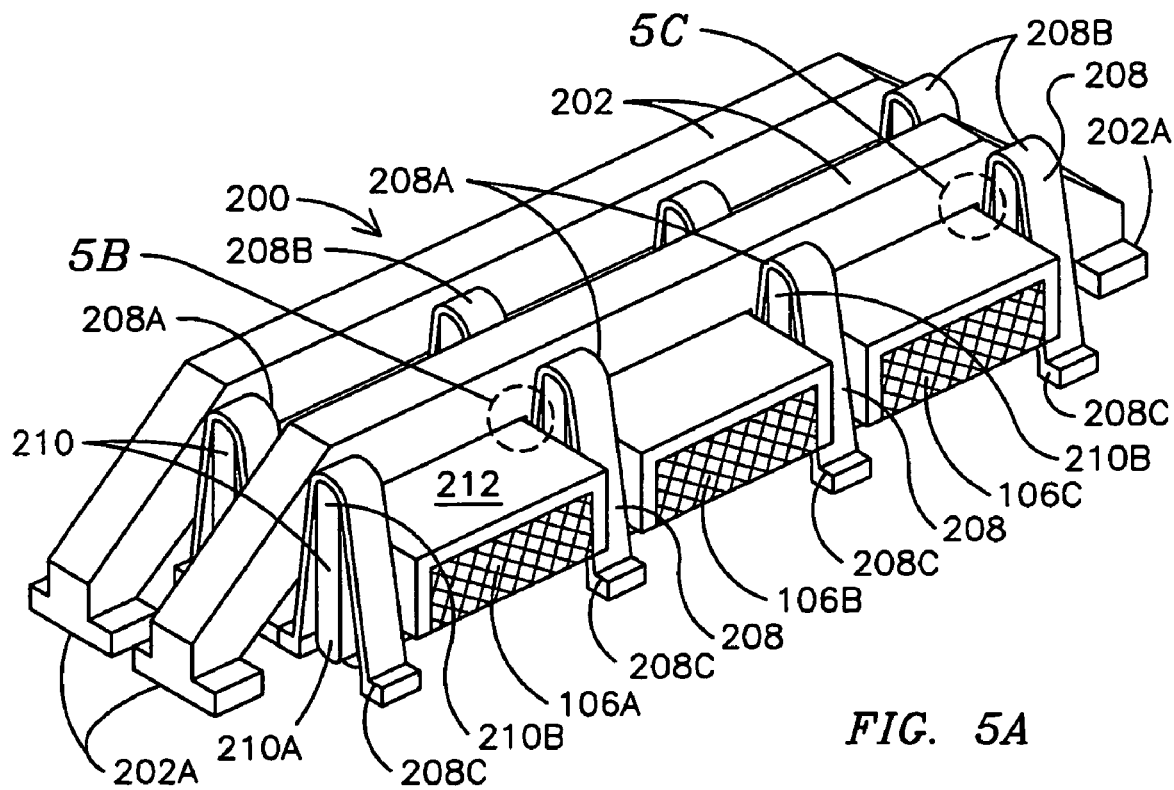
Figure 5B:
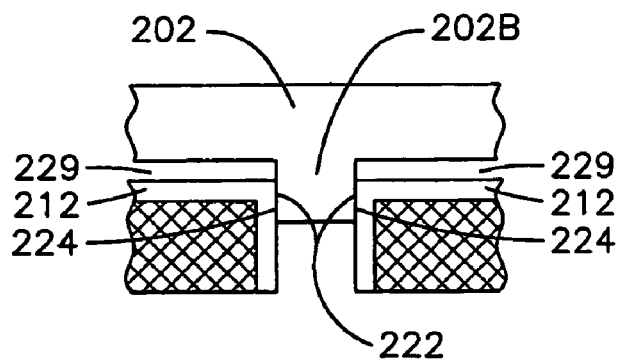
Figure 5C:
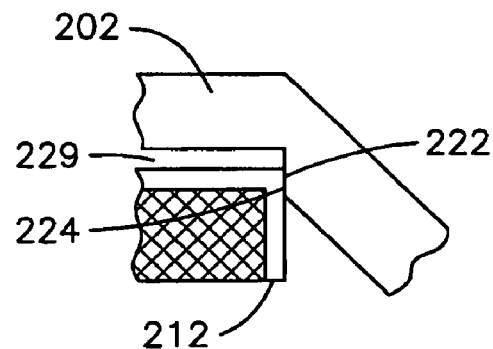
Figure 6:
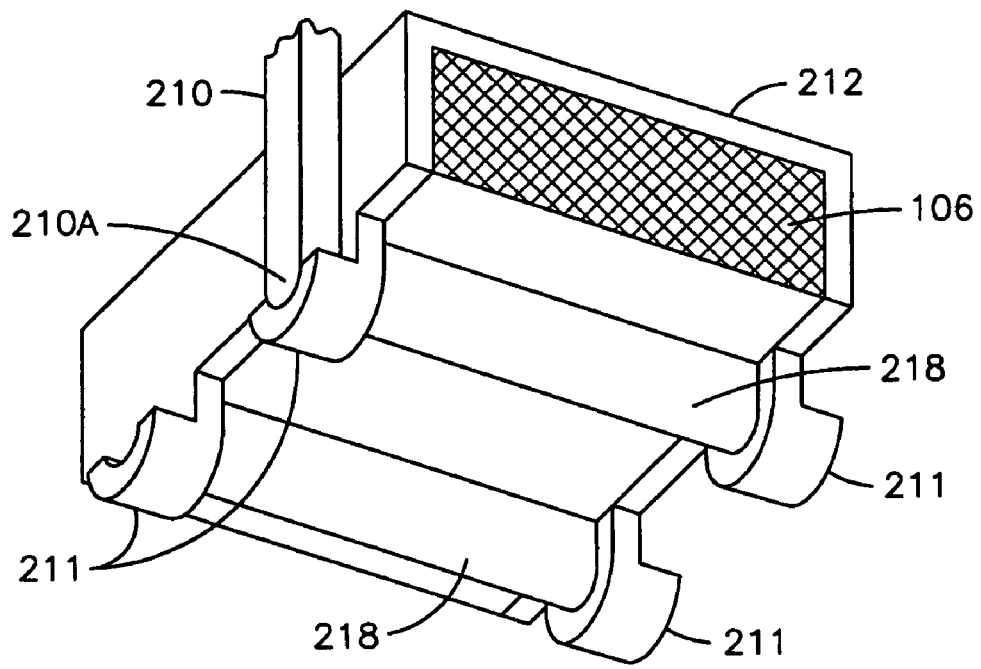

As can be seen in FIGS. 5A and 6, a lower end 210A of an FRP (fiberglass reinforced plastic) compression block 210 is supported within an arcuate tab 211 extending from sidewalls of the conductor enclosure 212. In a preferred embodiment a material of the conductor enclosure 212 comprises stainless steel, Inconel® or another suitable material having desired strength and thermal properties.

Arcuate tabs 211 also extend from the conductor enclosure 212 intermediate the superconducting blocks 106A and 106B and intermediate the superconducting blocks 106B and 106C, although these tabs are not visible in FIG. 5A. Each of these tabs also supports a compression block as illustrated in FIG. 6.

An upper end 210B of each FRP compression block 210 is received within an apex region 208B of the brackets 208. The brackets 208 are affixed to the rotor core 54 (or to a casing surrounding the compression support structure 200, neither shown in FIGS. 5A and 6) by any known fastening device (such as by a threaded bolt passing through an opening in a lower surface 208C of the brackets 208, the bolt engaging threads in an opening in the core 54). This arrangement causes the brackets 208 to apply a radially inwardly directed compressive bias force against the FRP elements 210 and in turn against the conductor enclosure 212 through the tabs 211.

As can be seen in FIG. 6, the superconducting blocks 106A, 106B and 106C are retained within separate segments of the conductor enclosure 212 by insulated (e.g., FRP) restraining blocks 218 extending from one sidewall to an opposing sidewall along a bottom region of the conductor enclosure 212. In the embodiment of FIG. 6, opposing ends of each block 218 are affixed to opposing inside surfaces of two adjacent tabs 211. In one embodiment the blocks 218 are affixed to the tabs 211 by passing a threaded bolt through an opening in the tab 211 for engaging threads in a mating opening of the block 218. The blocks 218 restrain the superconducting blocks 106A, 106B and 106C within the conductor enclosure 212 at low rotor speeds, and also maintain a proper width for each conductor block region of the conductor enclosure 212 to avoid application of excessive compressive forces to sidewalls of the blocks 106A, 106B or 106C.

The brackets 208 cooperate with the compression blocks 210 to support the normal and transient centrifugal force loads exerted on the superconducting blocks 106A, 106B and 106C during rotation of the superconducting rotor 50.

The overhang frames 202 support the centrifugal loads generated by their own mass and also lateral loads imposed on the superconducting blocks 106A, 106B and 106C during normal operation and transient conditions. These loads are transferred to the core 54 through the overhang frames 202. See the close-up insets of FIGS. 5B and 5C, where an overhang frame region 202B, defined by vertical surface 222, is snug fit within a header opening in the conductor enclosure 212, i.e., the header opening between the conductor blocks 106A and 106B, a header opening between the conductor block 106B and 106C and opposing corners of the conductor enclosure 212. The snug fit is achieved by contact between the surfaces 222 and surfaces 224 at the various contact locations.

Centrifugal force loads directed against the superconducting blocks 106A, 106B and 106C are not transferred to the overhang frames 202 due to gaps 229 (see FIGS. 5B and 5C) between a top surface of the conductor enclosure 212 and a facing bottom surface of the overhang frames 202; the gaps are present when the rotor is rotating at its nominal operating speed. The gaps also present an open in the thermal path from the warm rotor core 54 to the cold superconducting blocks 106A, 106B and 106C.

In addition to constructing the compression blocks 210 from an FRP material to limit heat flow from the core 54 to the conductor blocks 106A, 106B and 106C, the blocks are constructed with a desired length to increase the thermal path length and further limit heat flow.

To permit axial contraction of the conductor enclosure 212 responsive to the superconducting temperature of the superconducting blocks 106A, 106B and 106C, the compression blocks 210 rotate about a center point as the curved ends 210A and 210B slide along a respective contact surface with the arcuate tabs 211 and with the apex regions 208B.

In the embodiment of FIGS. 5A, 5B 5C and 6 the coolant flow paths are embedded within the superconducting blocks 106A, 106B and 106C and thus are not specifically illustrated in the Figures.

Third Embodiment

Figure 7:
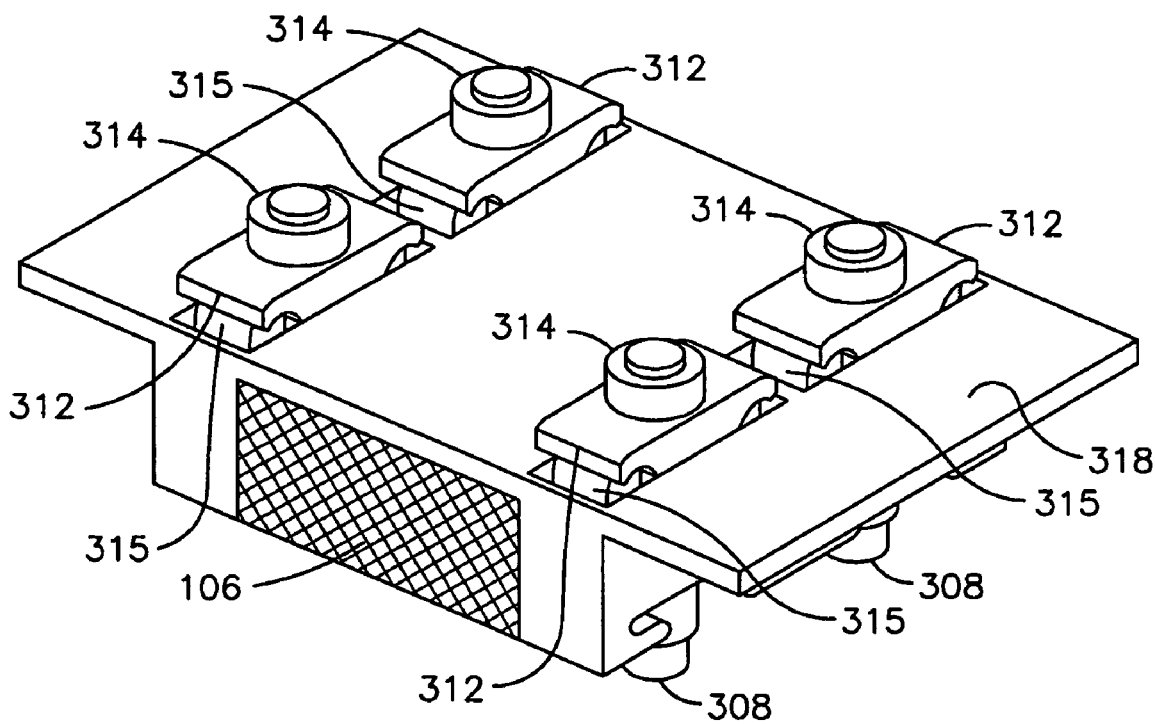
FIGS. 7 and 8 illustrate various views of a superconducting coil support structure according to a second embodiment of the present invention.
Figure 8:
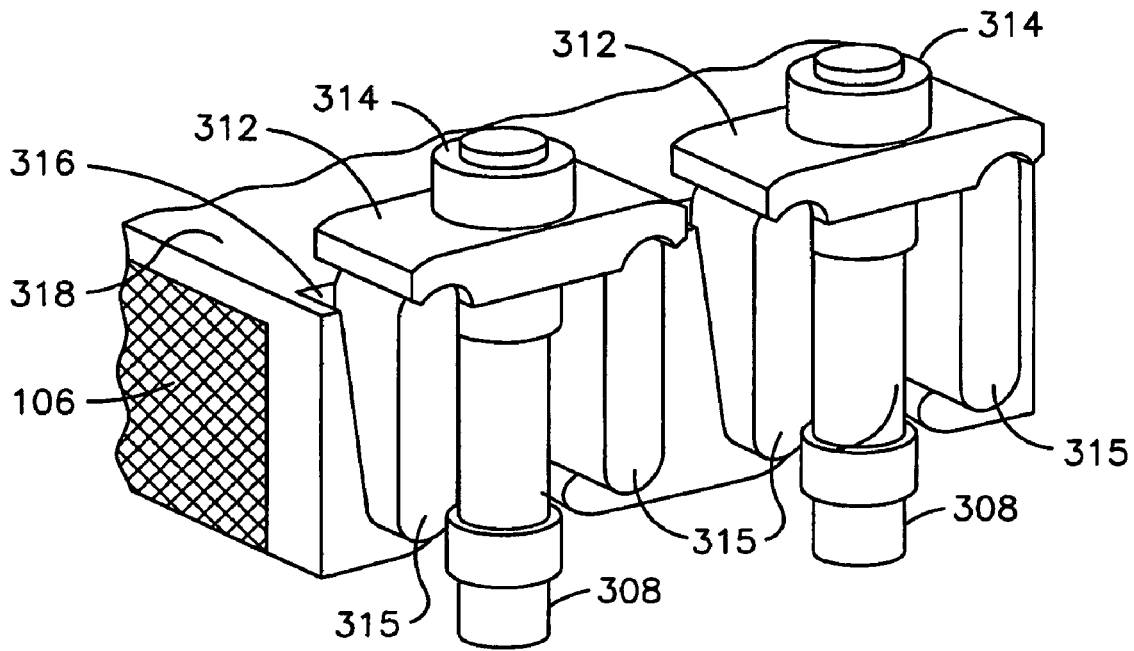

Another embodiment of a compression-type coil support 300 is illustrated in a perspective view of FIG. 7 and a sectional view of FIG. 8. Posts 308 are fixedly attached to the core 54 (not shown) (for example, threads formed in a lower region of the posts 308 threadably engage a mating threaded opening in the core 54). In conjunction with a plate 312 and a nut 314 (or another fastener as known by those skilled in the art) configured as illustrated, each post 308 exerts a compressive (radially inwardly directed) force on the superconducting block 106 and fiberglass reinforced plastic elements 315 disposed within wells 316 in sidewall surfaces of a conductor enclosure 318 to transfer the compressive force exerted by the plates 312 to the conductor enclosure 316, thereby compressively biasing the conductor block 106.

Fourth Embodiment

FIGS. 9-13 illustrate yet another embodiment comprising a coil support structure 400 (see FIG. 9A) attached to the rotor core 54 for supporting a single superconducting block 106. Other embodiments support two or more superconducting blocks in a side-by-side configuration employing elements similar in structure and function to the coil support structure 400.

The coil support structure 400 is supported by the core 54 and disposed between a shear block 402 rigidly affixed to or integrally formed with the core 54 and a removable shear block 403 disposed within a core axial slot. The shear blocks 402 and 403 restrain circumferential displacement of the support structure 400. According to one embodiment the removable shear block 403 is affixed to the core 54 by passing a bolt (not shown) through an opening in the block 403 and threadably engaging the bolt into a mating threaded hole in the core 54. To attach the support structure 400 to the core 54, the removable shear block 403 is removed, the structure 400 is urged against the shear block 402 and the shear block 403 is reattached to the core 54. Attachment of the structure 400 follows a reverse process.

As can be seen in the front view of FIG. 10A, the coil support structure 400 comprises a channel-like conductor enclosure 406 (a preferred material of the enclosure 406 comprises stainless steel) enclosing at least three surfaces of the superconducting block 106. Cooling channels (not shown in the Figures) are embedded with the block 106.

Figure 11:
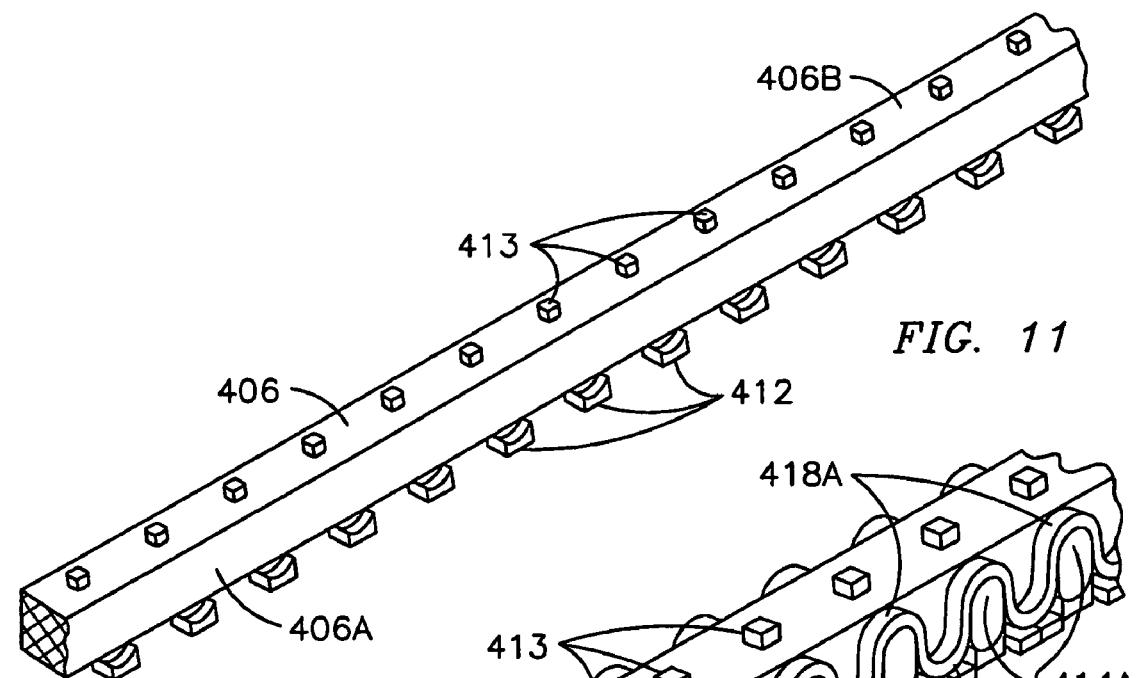

FIG. 11 illustrates a perspective view of the conductor enclosure 406, comprising sidewall surfaces 406A and 406B (the latter hidden from view in FIG. 11) and an upper surface 406C. Spaced apart tabs 412 extend outwardly from a lower region of the sidewalls 406A and 406B and spaced apart tabs 413 extend upwardly from the upper surface 406C.

Figure 12:
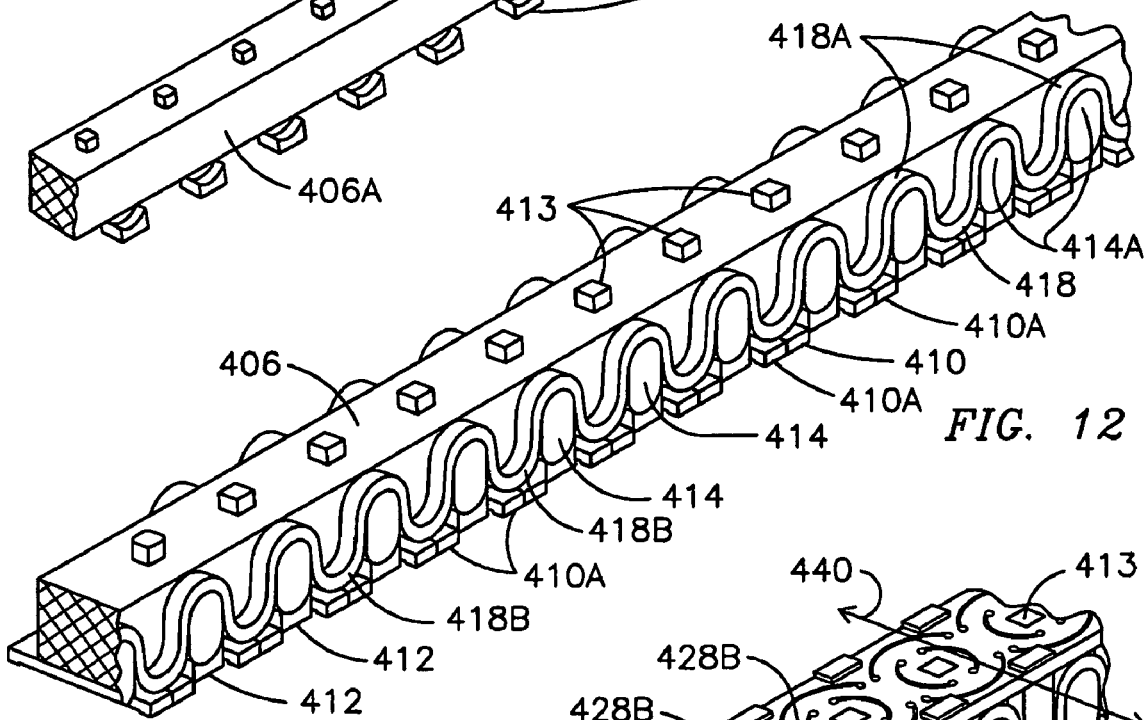
Figure 13:
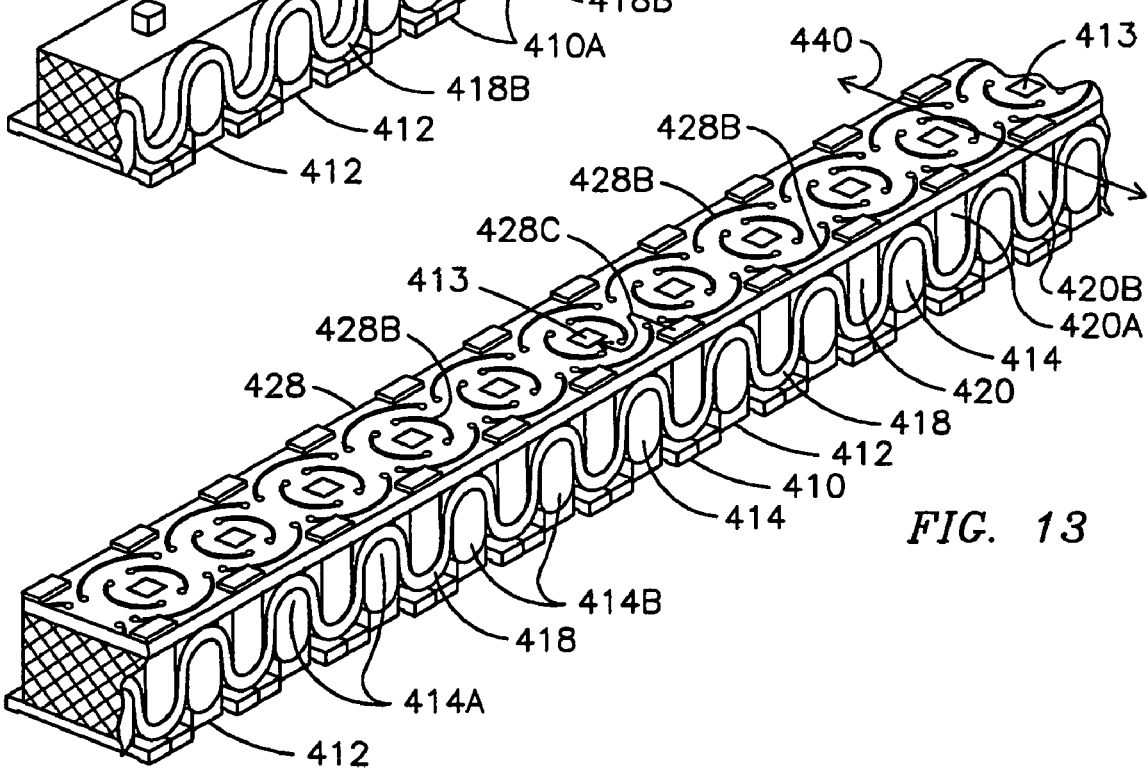

The conductor enclosure 406 frictionally captures (or fixedly attaches to) a lower insulation member 410 (comprising an FRP material) as illustrated. The lower insulation member 410 further comprises tabs 410A extending laterally from the member 410 and disposed between consecutive tabs 412 extending from the sidewall surfaces 406A and 406B as can be seen in FIGS. 12 and 13. The lower insulation member 410 effectively forms a bottom surface to close the enclosure 406 such that the superconducting block 106 is restrained within the conductor enclosure 406.

As illustrated in FIG. 12, a fiberglass reinforced plastic compression block 414 is disposed within a depression in an upper surface of each tab 412 extending from sidewalls 406A and 406B of the conductor enclosure 406. An undulating frame 418 (formed from stainless steel in one embodiment)

extends axially along the support channel 406 proximate or in contact with the sidewalls 406A and 406B. Upper curved segments 418A of the undulating frame 418 an engage upper surface 414A of each block 414 as shown. Between adjacent tabs 412, lower curved segments 418B of the frame 418 contact the laterally extending tabs 410A of the lower insulation member 410.

FIG. 13 further illustrates fiberglass reinforced plastic compression blocks 420 captured between the lower curved segments 418B of the frame 418 and an upper insulation member 428 (also formed from FRP material). The upper insulation member 428 defines a plurality of openings each one for receiving one of the tabs 413, and further defines a plurality of depressions 428A proximate edge surfaces thereof for receiving upper surfaces 420A of the FRP compression blocks 420. Lower surfaces 420B of the compression blocks 420 are received within the lower curved segments 418B of the frame 418.

With reference to FIG. 10A, gaps 429A and 429B are defined between the sidewall surface 406A and the FRP blocks 414/420 and between the sidewall surface 406B and the FRP blocks 414/420. A gap 429C is defined between the upper surface 406C of the conductor enclosure 406 and a lower surface of the upper insulation member 428. These gaps present a high thermal resistance in the various thermal paths between the warm core and the superconducting block 106.

Returning to FIG. 9A, an external casing 432 captures the various elements of the coil support structure 400 and is fixedly attached to the rotor core 54 using bolts 436 threadably engaging mating threads within the core 54. Ribs 437 provide additional structural integrity for the casing 432. A bottom plate 433 is attached (preferably welded) to the casing 432.

FIG. 9A depicts only a segment of the coil support structure 400. An extended length of the structure 400, including bolts 436 and ribs 437 spaced at desired intervals, forms the linear axial segment 60A (FIG. 2) of the superconducting coil or winding 60.

To limit heat transfer from the warm rotor core to the cold superconducting blocks, contact between interior surfaces of the external casing 432 and the various support elements of the superconducting block 106 is limited. Only projections 428C (see FIGS. 9A and 10A) of the upper insulation member 428 contact an interior upper surface region of the external casing 432. Only the tabs 410A of the lower insulation member 410 contact an interior lower surface region of the external casing 432 as illustrated in FIG. 9A.

A gap 433 (see FIG. 9B) between casing interior sidewall surfaces and the compression blocks 414 and 420 preclude contact between these surfaces and thus limit heat flow from the rotor 54 to the superconducting block 106 along this thermal path.

Heat transfer from the rotor core 54 to the superconducting block 106 is further impeded by the thermal insulating properties of the upper and lower insulation members 428 and 410 and the compression blocks 414 and 420, all formed from a material having a high thermal resistance, such as an FRP material.

In addition to limiting heat flow to the superconducting block 106, the elements of the coil support structure 400 also limit loads (e.g. centrifugal, lateral and axial) imposed on the conductor block 106 by normal operation and fault conditions of the superconducting generator.

When the rotor of the superconducting generator is rotating at relatively low speeds (e.g. a turning gear speed), movement of the superconducting block 106 due to its weight is restrained by the lower insulation member 410.

Higher speed centrifugal loads on the block 106 and the enclosure 406 are transferred by the tabs 412 to the fiberglass reinforced plastic compression blocks 414 then to the fiberglass reinforced plastic compression blocks 420 through the frame 418. The frame 418 is constructed from stainless steel and thus displays some elasticity during transfer of the load between the compression blocks 414 and 420. From the compression blocks 420, the load is transferred to the upper insulation member 428 then to the external casing 432 along the projections 428C (see FIG. 10A) in contact with an interior surface of the external casing 432. See also FIG. 9A.

As can be seen in FIG. 13, a plurality of gaps 428B are formed in the upper insulation member 428 for defining thermal conductive paths therein. The illustrated shape and location of the gaps 428B are merely exemplary. In one embodiment, a gap width is about 1-2 mm at the generator's rated speed. The gaps close responsive to fault or transient conditions that impose additional loads on the elements of the coil support structure 400.

The gaps 428B are configured and located to create a sufficiently long thermal conductive path for heat flow from the warm rotor through the external casing 432 to the projections 428C (see FIG. 10A) of the upper insulation member 428, through the path in the insulation member 428 as defined by the gaps 428B to the "cold" tabs 413 extending from the casing 406 to the superconducting block 106. Lengthening this heat flow path helps to maintain the cold temperature of the superconducting conductors 106. One such path is identified by arrowhead 428C in FIG. 13.

When the lateral load is relatively small during normal operation, the cross-sectional stiffness of upper insulation member 428 is sufficient to resist closure of the gaps 428B and thus the heat path through the upper insulation member 428 is maintained as described above. The superconducting block 106 is retained in place against normal lateral loads by the upper and lower insulation members 428 and 410, which also serve to damp rotor vibrations.

Under fault conditions the lateral loads (that is, loads in directions represented by a double arrowhead 440 in FIG. 13) increase, deforming the upper insulation member 428 and reducing the gap width (under certain fault conditions the gaps 428B may close). Under such conditions the lateral loads imposed on the superconducting block 106 are transferred to the casing 432, via the upper insulation member 228, preventing deformation of the superconducting filaments within the block 106.

Since the duration of a transient or fault condition is typically a few seconds closure of the gaps 428B and the resulting shorting of the thermal path between the conductors 106 and the rotor core 54 does not result in an appreciable temperature change the superconducting conductors in the block 106. When the loading returns to a steady state condition after the fault, the gap width is restored and the thermal path returns to its extended state.

The ribs 437 (see FIG. 9A) of the external casing 432 provide support for both centrifugal and lateral loads encountered by the superconducting block 106 (and their associated components) during normal generator operation and during fault conditions.

The fiberglass reinforced plastic compression blocks 414 and 420 are oriented to adapt to the axial thermally-induced contraction of the coil support structure 400 at the low operating temperatures required to maintain the superconducting block 106 in a superconducting state. That is, the significant temperature differential between the rotor core 54 and the coil support structures 400 causes the latter to contract relative to the former. To accommodate this contraction, the curved surfaces 414A/414B and 420A/420B of the compression blocks 414 and 420 (see FIG. 13) allow the blocks to rotate (in a plane parallel to the sidewall surfaces 406A and 406B) so that the cold superconducting block 106 can move axially relative to the external casing 432, which is attached to the rotor core. The upper and lower insulation members 428 and 410 also move relative to the external casing 432 as the enclosure 406 contracts.

The degree of rotation for any block 414 or 420 depends on the axial location of the block relative to the axial length of the rotor 54, with a rotation angle of about zero degrees at a midpoint of the rotor's axis and a maximum rotation angle at the rotor ends.

Preferably a vacuum enclosure (such as the vacuum enclosure 110 of FIG. 3A) surrounds the rotor core 54 and the components associated with the coil support structure 400. A vacuum drawn around the structure 400 reduces convective heat transfer from the warm rotor core 54 to the windings of the superconducting block 106. The vacuum enclosure also reduces the intrusion of stray magnetic fields into the region surrounding the rotor core 54.

Fifth Embodiment

Figure 14:
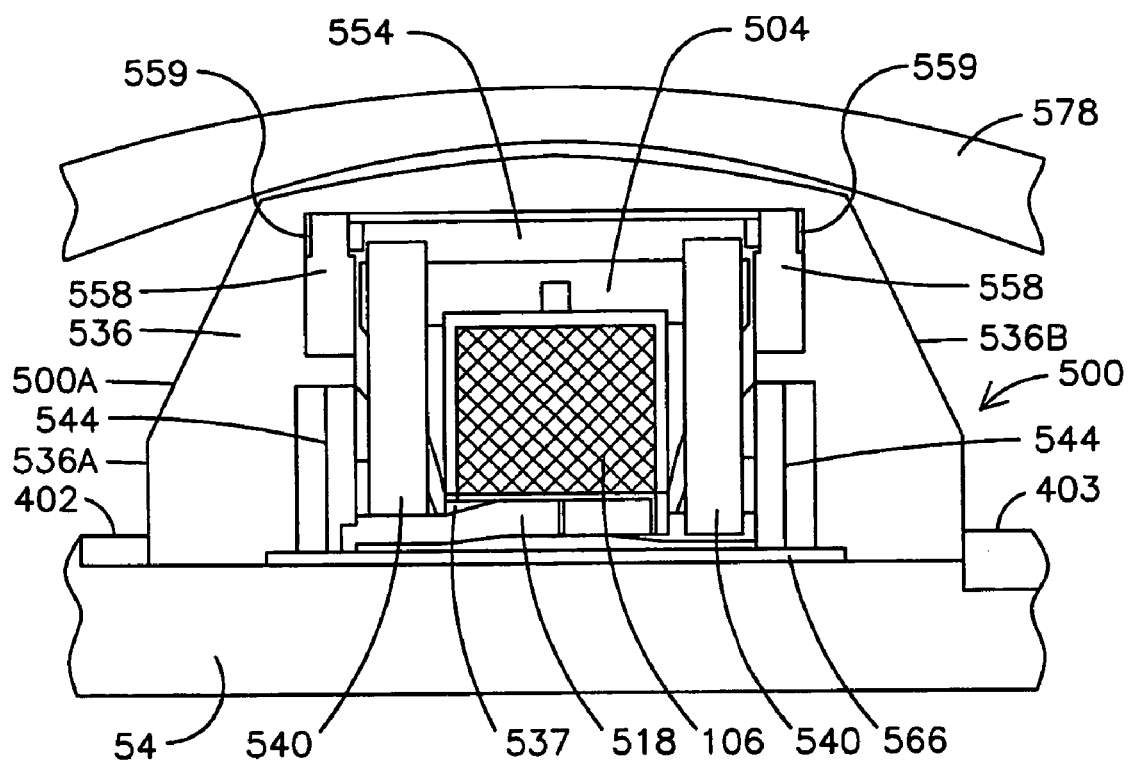
FIGS. 14-22 illustrate various views of superconducting coil support structure according to a fourth embodiment of the present invention.
Figure 15:
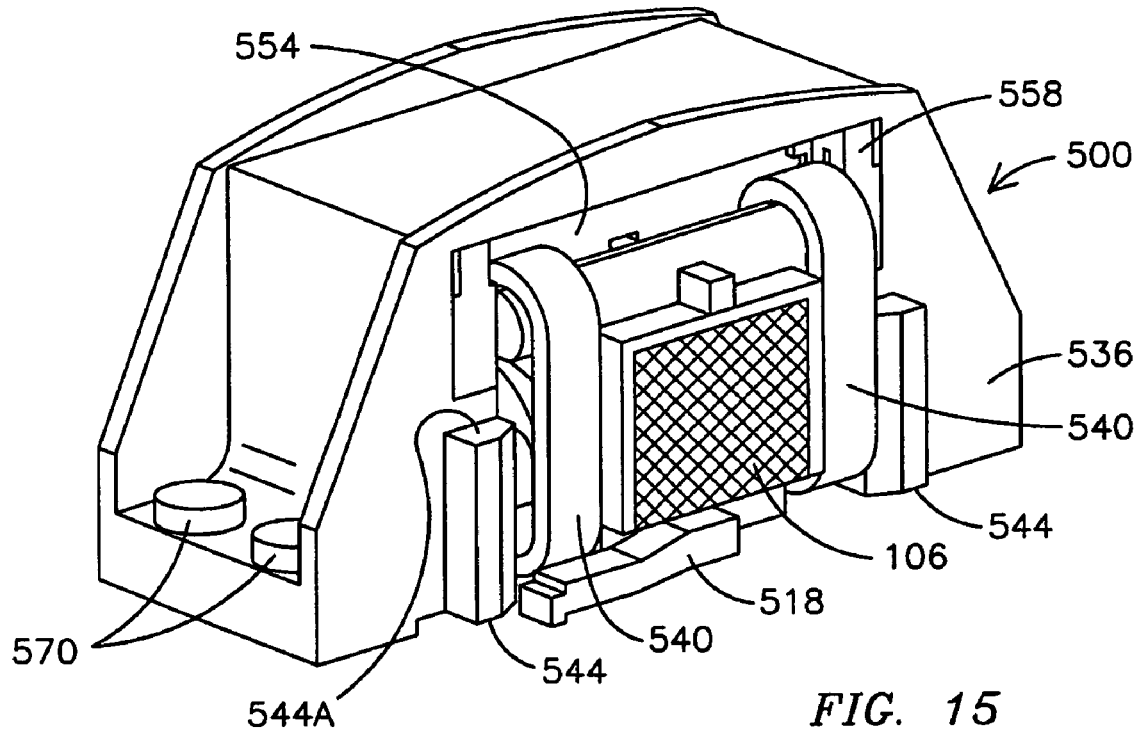

FIG. 14 depicts an elevation view and FIG. 15 a perspective view of one segment of a tension-only coil support structure 500 according to another embodiment of the present invention.

Figure 16:
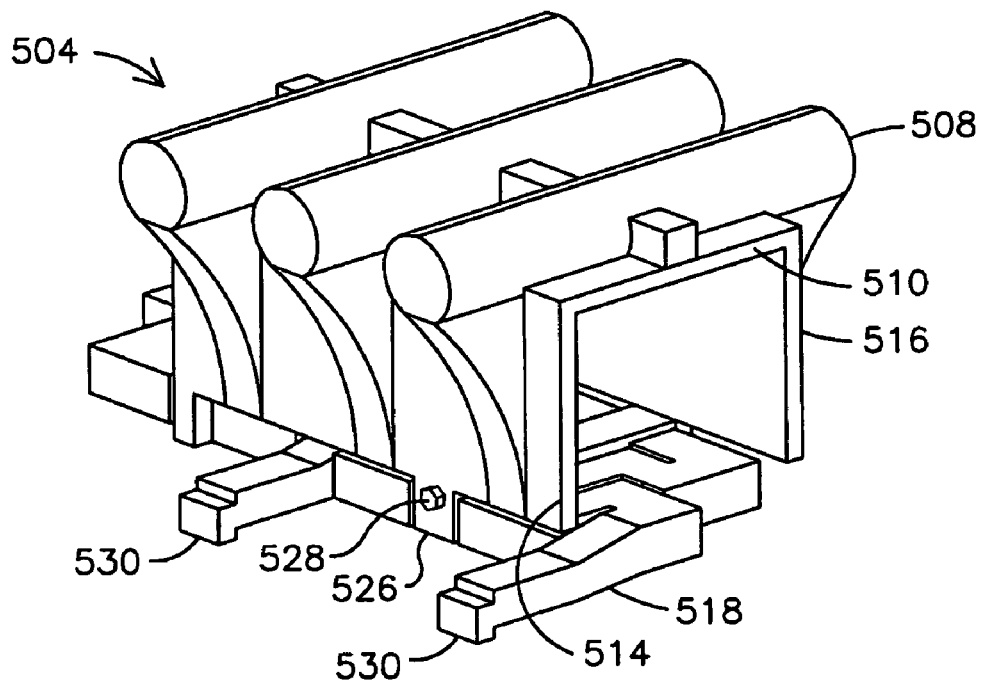

As illustrated in FIG. 14, the single superconducting block 106 (and coolant channels for carrying the cryogenic coolant embedded therewithin) is supported by a conductor enclosure 504 (preferably constructed from stainless steel) comprising rib supports 508 (see FIG. 16) disposed on an upper surface 510 and further comprising sidewall surfaces 514 and 516 (see FIG. 16). Although this embodiment is described and illustrated with a single superconducting block 106, other embodiments comprising two or more superconducting blocks 106 are easily accommodated, as can be appreciated by those skilled in the art.

Figure 18:
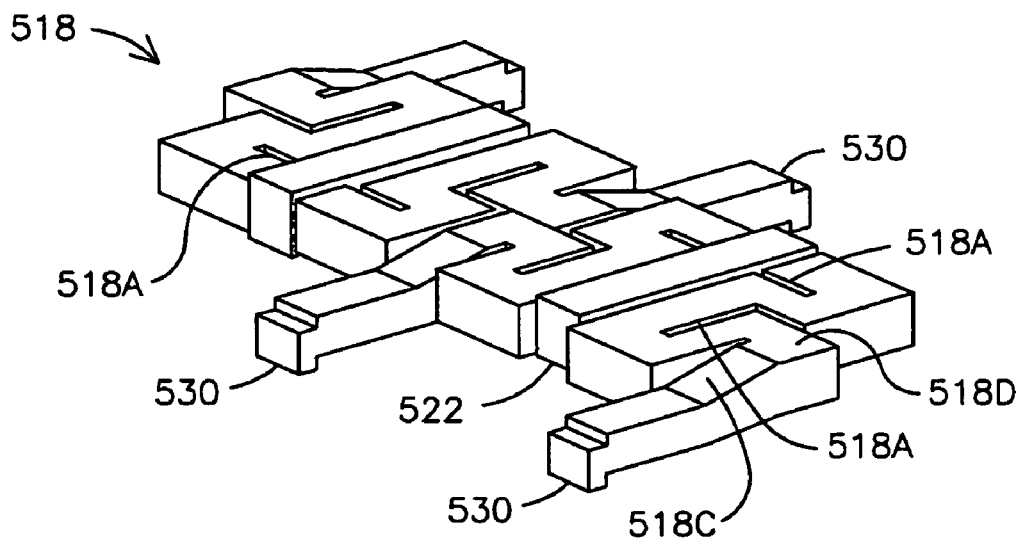

A lower insulation member 518 is disposed to form a lower surface of the conductor enclosure 504, enclosing the superconducting block 106 within the enclosure 504. See FIG. 16. As illustrated in FIG. 18, the lower insulation member 518 defines notches 522 for receiving tabs 526 protruding downwardly from the sidewall surface 514 and 516 (see FIG. 16) of the enclosure 504. Preferably, bolts 528 or other attachment devices extend through an opening in the tabs 526 for engaging mating threaded holes in the region of the notches 522 in the lower insulation member 518 to attach the lower insulation member 518 to the conductor enclosure 504. (The lower insulation member 410 of FIG. 10 is similarly affixed to the conductor enclosure 406.) This arrangement can exert sufficient restraining forces on the superconducting block 106 to restrain the block within the enclosure 504 against its own weight and against forces exerted on the block 106 at relatively low rotor speeds.

Figure 17:
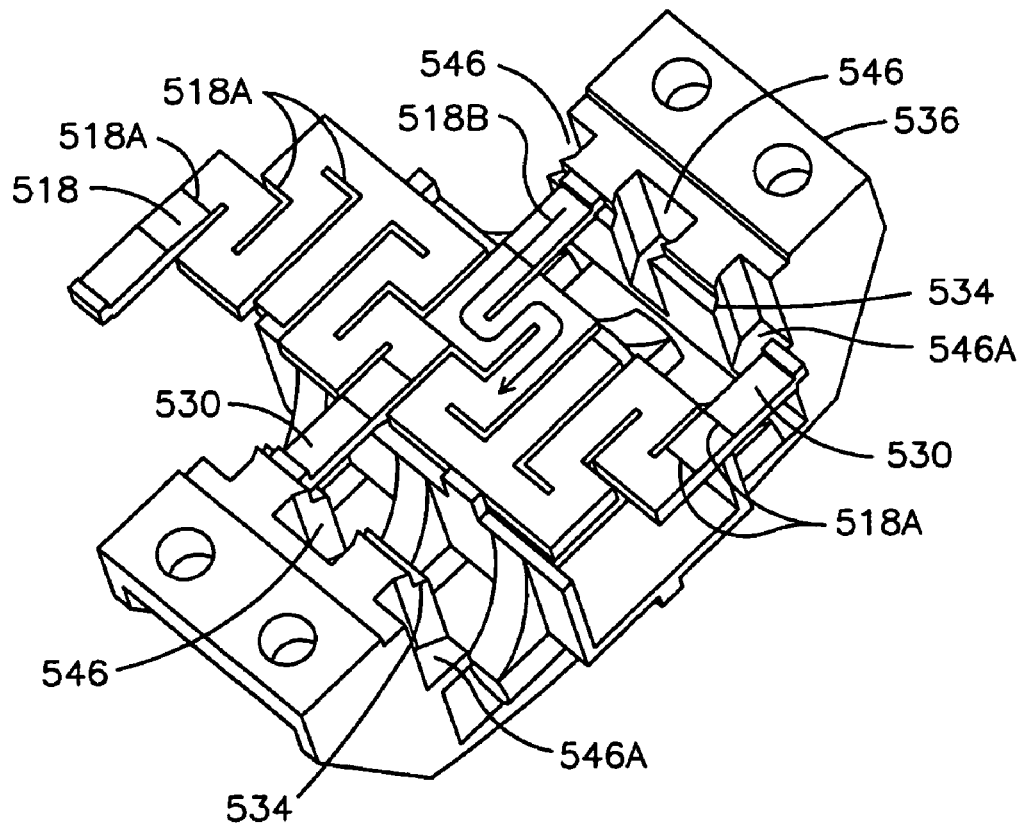

As can be seen in FIG. 17, after assembly of the coil support structure 500, fingers 530 extending laterally from the lower insulation member 518 are received within notches 534 in a lower region of an external casing 536.

The lower insulation member 518 defines gaps 518A (see FIGS. 17 and 18) for establishing a thermal conductive path through the insulation member 518. In one embodiment the gaps are about two to five millimeters wide. One such path is illustrated by an arrowhead 518B. The illustrated shape and location of the gaps 518A are merely exemplary and therefore the illustrated path 518B is merely exemplary. Since little heat flows across the gaps, they lengthen the thermally conductive path from the warm rotor core 54 through the external casing 536 attached to the core, to the fingers 530 of the lower insulation member 518 in contact with the superconducting block 106. See FIG. 17. Lengthening this heat flow path through use of the gaps helps to maintain the cold temperature of the superconducting block 106. However in response to certain load conditions experienced by the coil support structure 500, the gaps close to direct the load forces to structural elements capable of absorbing them (i.e., the rotor core 54).

As further illustrated in FIG. 18, the fingers 530 extending from the lower insulation member 530 extend downwardly from a plane of the lower insulation member 518, creating a gap 537 (see FIG. 14) between a lower surface of the superconducting block 106 and an upper surface of the fingers 530, further limiting heat flow from the warm rotor core 54 to the superconducting block 106. In a preferred embodiment the gap is about 3 to 5 mm. The area in which the gap is formed can also be seen in FIG. 18, illustrating an inclined surface 518C extending downwardly from an upper surface 518D of the lower insulation member.

To properly limit the forces imposed on the superconducting filaments within the block 106, it is desired to increase the thickness of the lower insulation member 518. However, an increased thickness reduces the thermal path resistivity, i.e., an increased thickness increases the cross section of the thermal path, which reduces the thermal path resistance. Reduction of the thermal path resistance allows more heat flow from the warm rotor to the cold superconducting conductors. Thus the trade off between maintaining the structural integrity of the superconducting conductors by limiting forces imposed on them and decreasing the thermal resistance of those structures must be considered.

Figure 19:
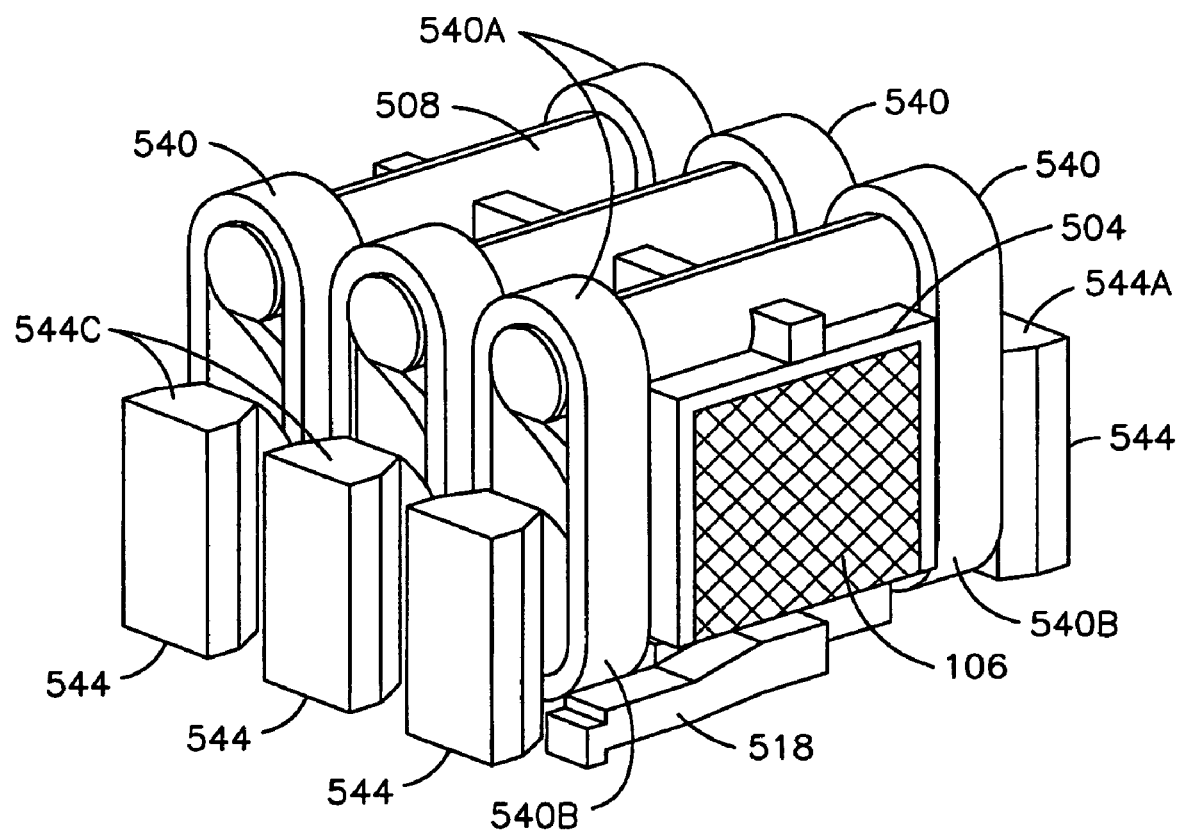

As illustrated in FIG. 19, an upper arcuate segment 540A of each tension fiberglass reinforced plastic (FRP) band 540 encircles a rib support 508 and extends toward the lower insulation member 518. A protruding member 544A of a support leg 544 (wedge-shaped or T-head shaped and preferably comprising a ferrous material) is captured within a lower arcuate region 540B of each band 540, while a body portion 544B is received within notches 546 (see FIG. 17) of the external casing 536. The bands 540 transfer centrifugal loads imposed on the enclosure 504 (and the superconducting block 106 disposed therein) to the casing 536 through the support legs 544. Note that an upper surface 544C of the support leg 544 contacts a surface 546A of the notch 546 to transfer the centrifugal loads from the support leg 544 to the casing 536. These loads are then transferred to the core 54 through the casing 536.

The upper and lower arcuate segments 540A and 540B of the FRP bands 540 permit the bands 540 to adapt to the axial contraction induced by the cold components of the tension-only support structure 500. As the channel 504 contracts axially due to coolant flow through coolant channels embedded within the superconducting block 106, the support legs 544 are held firmly within the notches 546 of the casing 536. But the upper arcuate segments 540A are permitted to slide freely over the rib supports 508 and the lower arcuate segments 540B are permitted to slide freely over the protrusions 544B to allow axial contraction of the channel 504 (and the superconducting block 106). This motion prevents damage to the superconducting conductors and the conductor enclosure 504.

Figure 20:
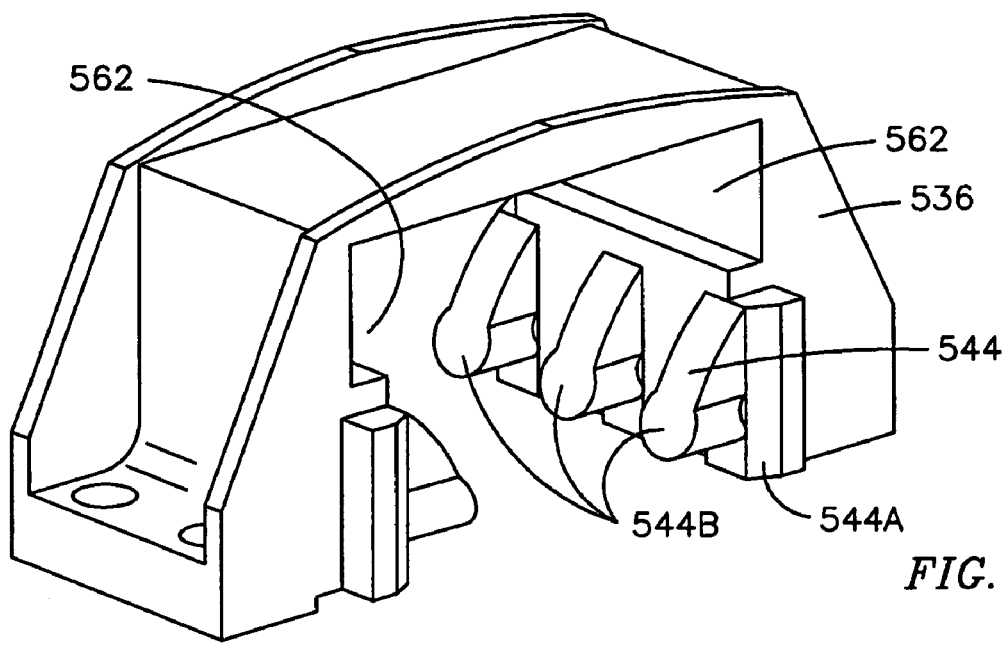
Figure 21:
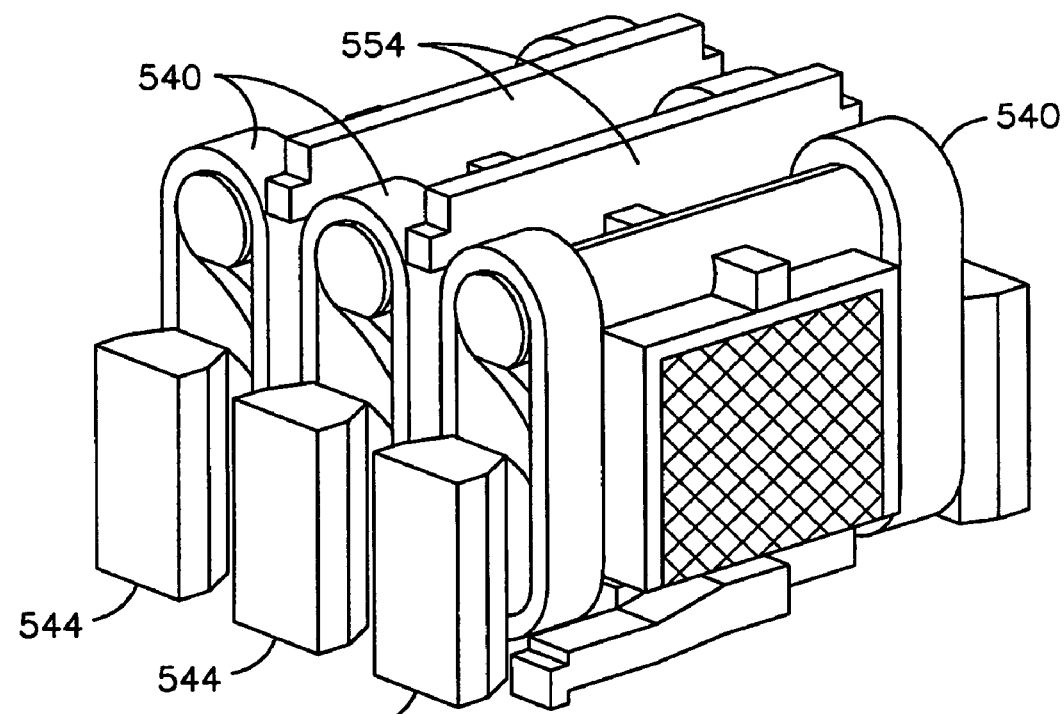
Figure 22:
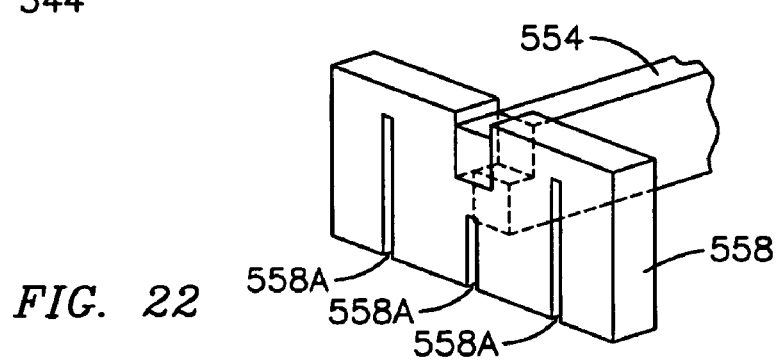

FIG. 21 illustrates elongated insulation members 554 disposed between adjacent bands 540. Insulation members 558 (illustrated in FIGS. 14 and 15) are received within openings 562 (see FIG. 20) of the external casing 536 and mate with notches disposed at opposing ends of the elongated insulation members 554 as illustrated in FIGS. 14, 15, 21 and 22. FIG. 22 also illustrates gaps 558A in the insulation member 558 for lengthening the thermal path within the member 558.

The insulation members 554 and 558 cooperate to support lateral loads imposed on the superconducting block 106 by transferring these loads to the external casing 536. The members 554 and 558 also damp rotor vibrations and insulate the cold superconducting block 106 from the surrounding warm components, in particular the external casing 536. As further illustrated in FIG. 14, a gap 559 is defined between a region of an outwardly facing surface of the insulation member 558 and an inwardly facing surface of the notches 562. Under certain transient conditions, the gap 559 closes to transfer lateral forces to the external casing 536.

A bottom plate 566 (see FIG. 14) is affixed (preferably by welding) to the external casing 536 to completely enclose the structural elements therewithin and permit drawing a vacuum within the external casing 536.

The tension-only coil support structure 500 is disposed on the rotor core 54 with a sidewall 536A of the casing 536 urged against the shear block 402 as illustrated in FIG. 14. The casing 536 is rigidly affixed to the rotor core 54, typically by engaging bolts 570 (see FIG. 15) into threaded receiving holes formed in the core 54. The removable shear block 403 is urged against a sidewall 536B of the casing 536 and rigidly affixed to the core 54 (typically by bolting to the rotor core 54).

A vacuum/magnetic shield 578 (see FIG. 14) permits drawing a vacuum surrounding the casing 536 to limit convective heat transfer.

Sixth Embodiment

Figure 23:
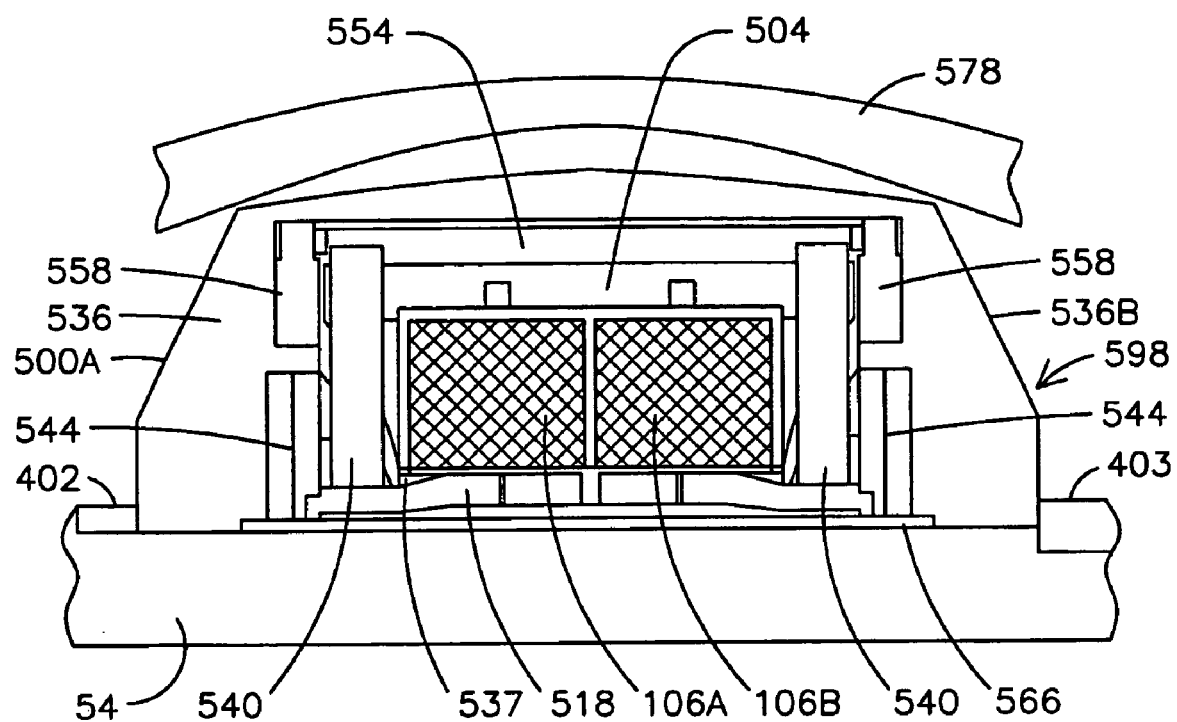
FIG. 23 illustrates a superconducting coil support structure according to a fifth embodiment of the present invention.

FIG. 23 illustrates a conductor support structure 598, similar to the conductor support structure 500, but suitably sized to accommodate two superconducting conductors 106A and 106B.

Seventh Embodiment

According to another embodiment of the present invention a tension-only coil support structure 600 supports two superconducting blocks 106A and 106B, although more or fewer superconducting blocks can be accommodated. The coil support 600 is illustrated in an elevation view of FIG. 24 and a perspective view of FIG. 25, and elements thereof are illustrated in FIGS. 26-30.

The dual superconducting blocks 106A and 106B are supported within a dual conductor block enclosure 604. The dual conductor enclosure 604, preferably constructed from stainless steel, comprises sidewall surfaces 604A and 604B and an interior wall surface 604C separating the superconducting blocks 106A and 106B, which are omitted from FIG. 26 for clarity. A cross beam 606 extends from an upper surface 604D of the enclosure 604; rib supports 608 protrude laterally from the cross beam 606.

Figure 26:
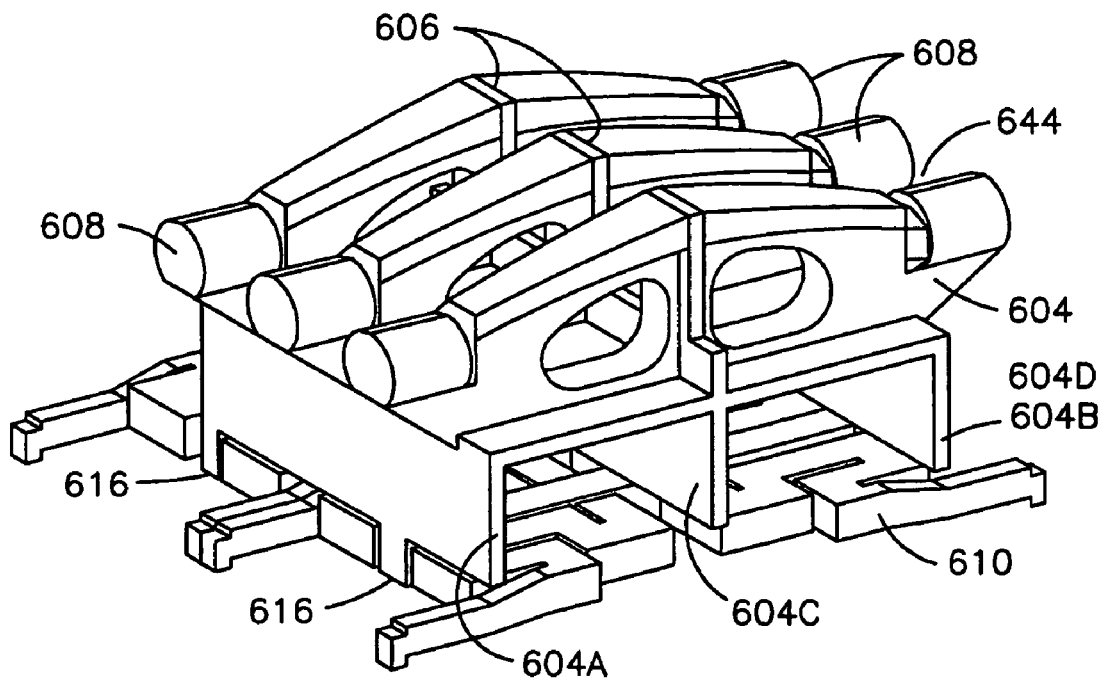
Figure 27:
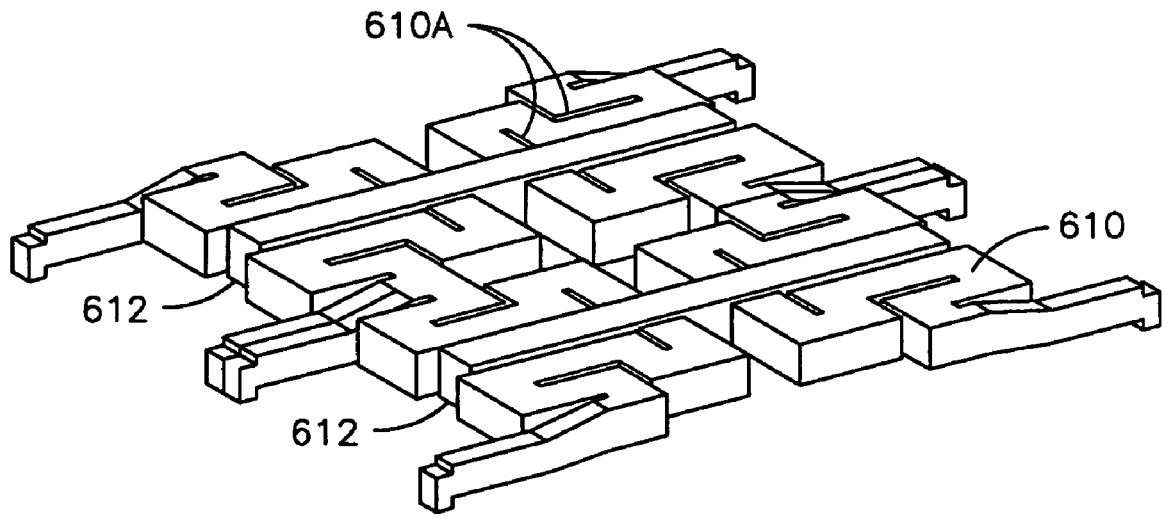

With reference to FIGS. 26 and 27, a lower insulation member 610 forms a bottom surface for the enclosure 604 to retain the superconducting blocks 106A and 106B within the enclosure 604. Notches 612 defined in the lower insulation member 610 (see FIG. 27) engage tabs 616 (see FIG. 26) protruding downwardly from the sidewall surfaces 604A and 604B of the enclosure 604. Note that the tabs 616 protruding downwardly from the sidewall surface 604B are hidden from view in FIG. 26. Each tab 616 is held within a respective notch 612 by a bolt (or other fastening mechanism) extending through an opening in each tab 616 for threadably mating with threads formed in an opening within the lower insulation member 610.

Figure 28:
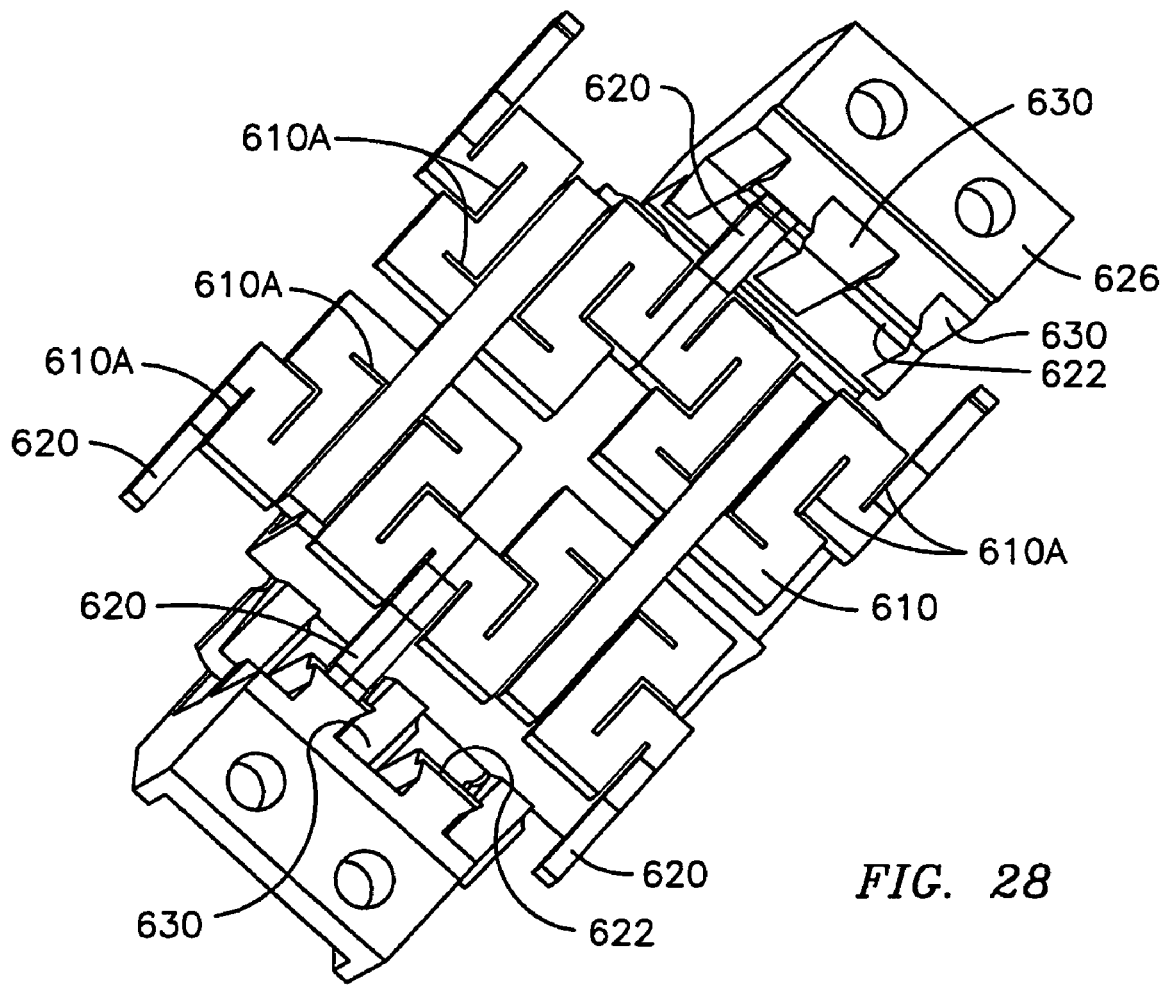

As can be further seen in the bottom view of FIG. 28, fingers 620 extending laterally from the lower insulation member 610 engage notches 622 in a lower region of an external casing 626. As can be seen in the various Figures, fingers 620 disposed on the outer edges of the lower insulation member 610 are narrower than those disposed in a mid region of the lower insulation member 610. When a plurality of the coil support structures 600 are placed in an end-to-end arrangement to form the coil support structure 60 of FIG. 2, two lower insulation members are abutted, thereby doubling the width of the fingers 620 on the outer edges of the lower insulation member 610.

Figure 24:
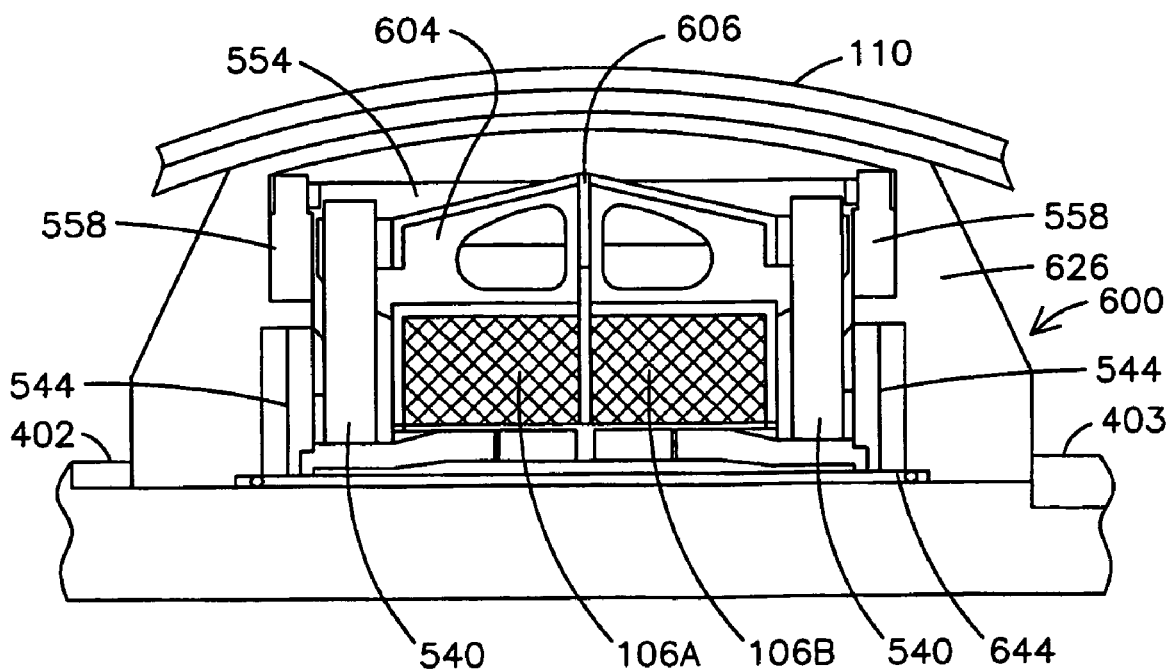
FIGS. 24-30 illustrate various views of superconducting coil support structure according to a sixth embodiment of the present invention.
Figure 25:
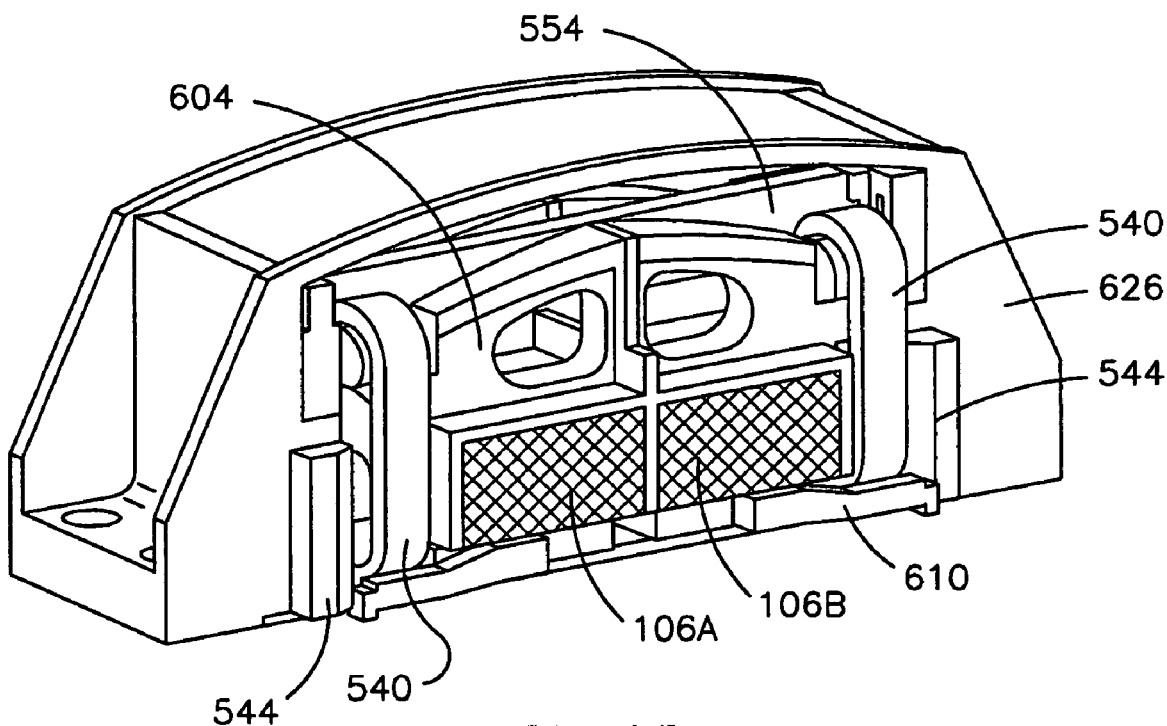
Figure 29:
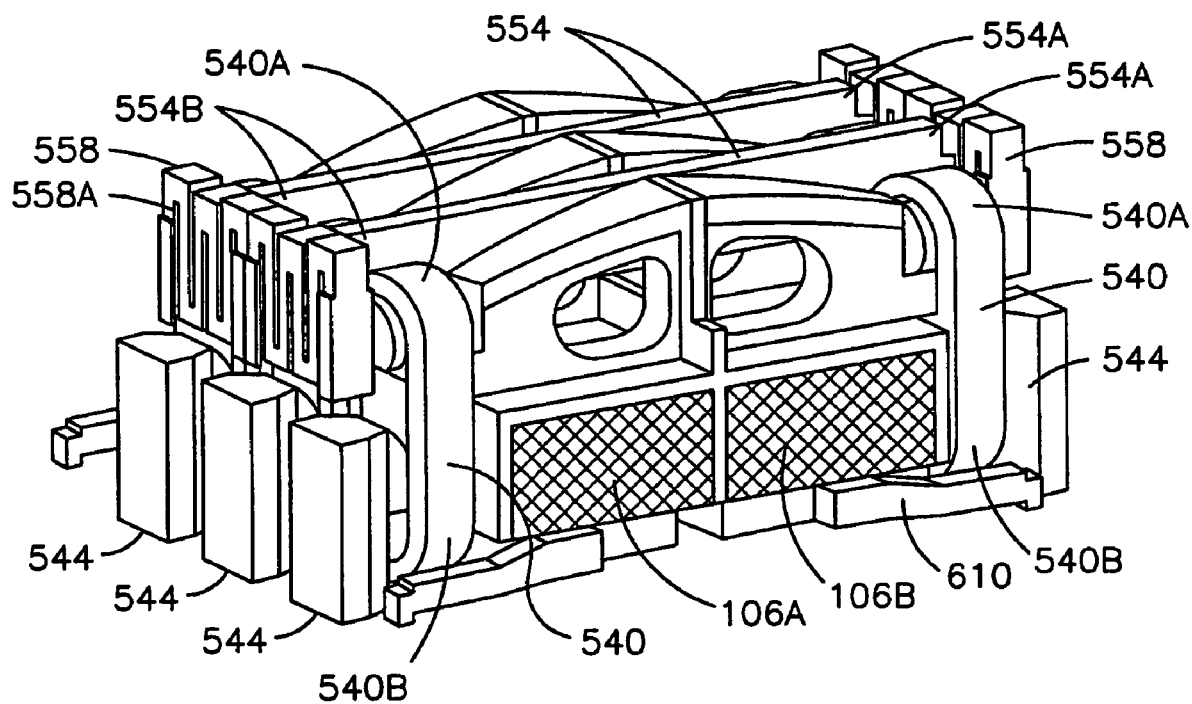
Figure 30:
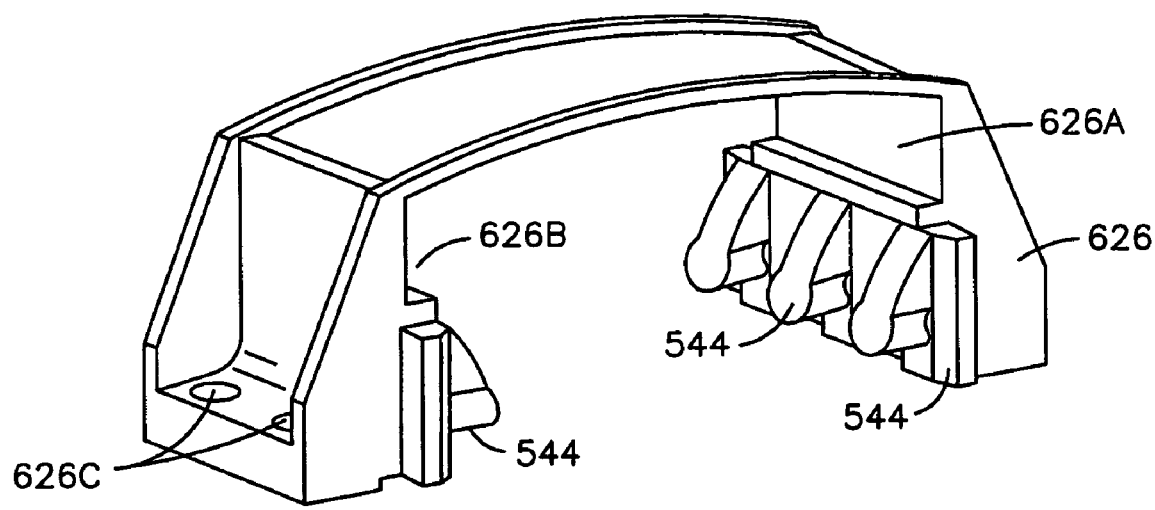

As illustrated in FIG. 29, the tension fiberglass reinforced plastic (FRP) bands 540 each comprise the upper arcuate segment 540A partially encircling the rib supports 608 and the lower arcuate segment 540B captured by protruding members extending from support legs 544. A body portion of each support leg 544 is captured within openings 630 (see FIG. 28) of the external casing 626. FIGS. 24 and 25 also illustrate the support legs 544 captured within the openings 630 of the casing 626.

The band elements 540 transfer centrifugal loads imposed on the enclosure 604 and the superconducting blocks 106A and 106B disposed therein, to the casing 536 through the support legs 544. Attachment of the casing 536 to the core 54 as illustrated in FIG. 24 transfers these loads to the core 54.

The upper arcuate segments 540A of the FRP band elements 540 permit the band elements 540 to adapt to the axial contraction induced by the cold components of the tension-only support structure 600 as the upper arcuate segments 540A slide along the rib supports 608 and the lower arcuate segments 540B slide along protrusions 544B responsive to axial contraction of the enclosure 604 and the superconducting conductors 106A and 106B disposed therein.

FIG. 29 also illustrates elongated insulation members 554 disposed between adjacent band elements 540 and received within openings 644 (see FIG. 26) between successive cross beams 606. Ends 554A and 554B of the insulation members 554 each engage the insulation member 558 as illustrated in FIGS. 29 and 22. When the casing 626 is disposed over the support components, as illustrated in FIGS. 24 and 25, the insulation members 558 are disposed within opposing notches 626A and 626B (see FIG. 30) of the casing 626.

The insulation members 554 and 558 cooperate to support lateral loads imposed on the superconducting conductors 106A and 106B, damp rotor vibrations and insulate the cold superconducting blocks 106A and 106B from the surrounding warm components.

The lower insulation member 610 and the insulation members 558 define gaps therein (respectively gaps 610A illustrated in FIG. 27 and gaps 558A illustrated in FIG. 29) to elongate the thermal conductive paths between the warm rotor and the cold enclosure 604 and the superconducting blocks 106A and 106B disposed therein. As can be seen in FIGS. 26 and 27, the cold enclosure 604 contacts the lower insulation member 610 where the tabs 616 are received within the notches 612. The thermal path continues through the lower insulation member 610 along paths defined by the gaps 610A. The paths extend to the fingers 620 that mate with the notches 622 of the casing 626 then to the core 54.

A bottom plate 644 (see FIG. 24) is affixed (typically be welding) to the external casing 626 to completely enclose the structural elements within the external casing 626.

The tension-only coil support structure 600 is disposed on the rotor core 54, as illustrated in FIG. 23, preferably using threaded bolts (not shown) passing through casing openings 626C (see FIG. 30) and engaging mated threaded openings in the core 54. Further the casing is rigidly captured between the integral shear block 402 and the removable shear block 403.

The shield 110 (see FIG. 24) is disposed surrounding the core 54 and the support structure 600 as in the embodiments described above, permitting a vacuum to be drawn to limit convective heat transfer between the various elements of the coil support structure 600.

Eighth Embodiment

Figure 31A:
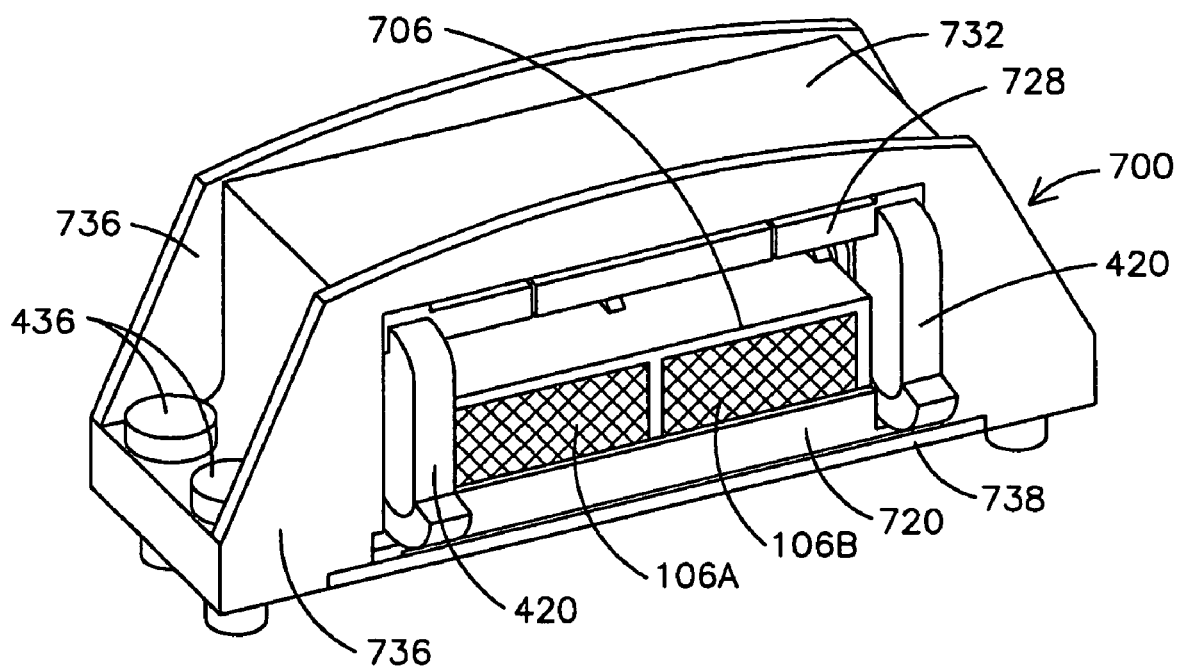
FIGS. 31-36 illustrate various views of superconducting coil support structure according to a seventh embodiment of the present invention.

Another embodiment of a compression-type coil support 700 for supporting two superconducting blocks 106A and 106B is illustrated in a perspective view of FIG. 31A. In other embodiments more or fewer superconducting blocks can be supported. The support structure 700 comprises a dual support channel 706 (a preferred material of the support channel 706 comprises stainless steel) for surrounding at least three surfaces of the superconducting blocks 106A and 106B. FIG. 31A depicts a region of the elongated coil support structure 700 that forms the superconducting coil 60 of FIG. 2. Within the superconducting coil 60, the bolts 436 and external ribs 736 are disposed at predetermined intervals along an extended coil support structure 700. The coolant channels are embedded within the superconducting blocks 106A and 106B.

Figure 32:
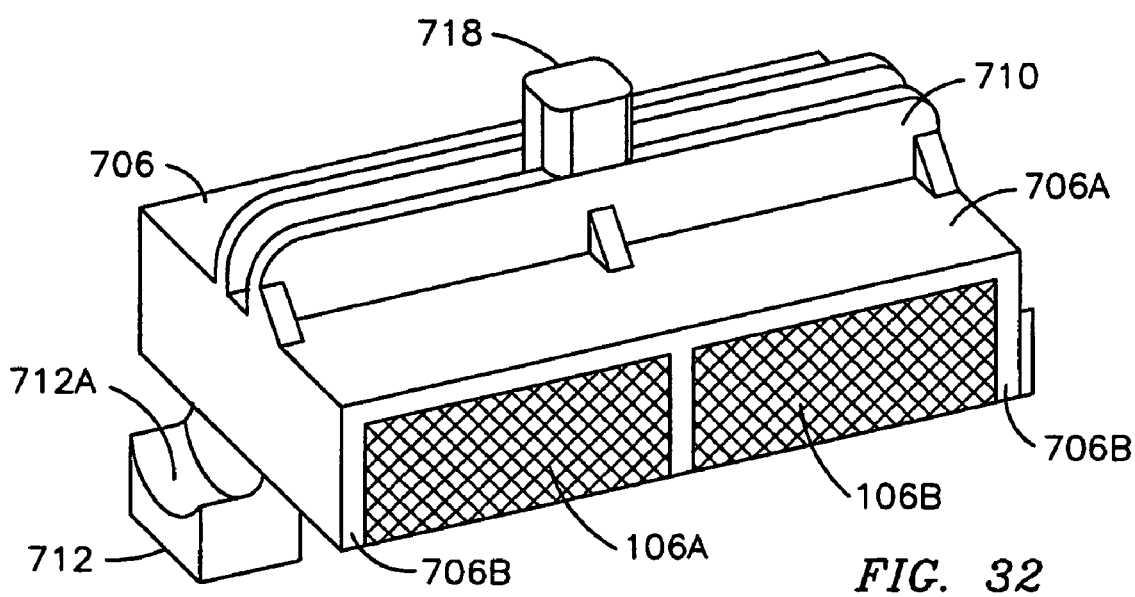

FIG. 32 illustrates a perspective view of a first embodiment of the dual support channel 706 including a cross member 710 extending from a top surface 706A and tabs 712 having an arcuate depression 712A in an upper surface thereof extending from sidewall surfaces 706B and 706C of the support channel 706. The arcuate tab 712 on the right-hand sidewall is not visible in FIG. 32.

Figure 33:
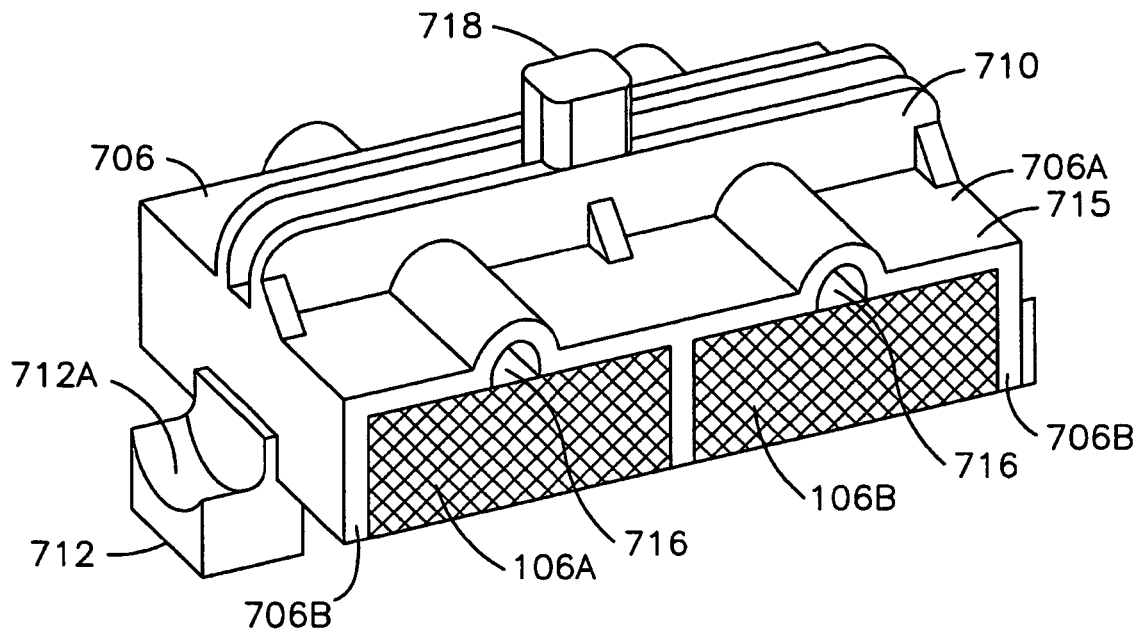

FIG. 33 illustrates a perspective view of a second embodiment of a dual support channel 715 including grooves 716 formed in a top surface 715A and operative as coolant channels for carrying the coolant proximate the superconducting blocks 106A and 106B.

Tabs 718 extend upwardly from the cross member 710 in both support channel embodiments 706 and 715.

The support channels 706 and 715 are interchangeable within the scope of the present invention, but for simplicity subsequent references will refer only to the support channel 715.

Figure 34:
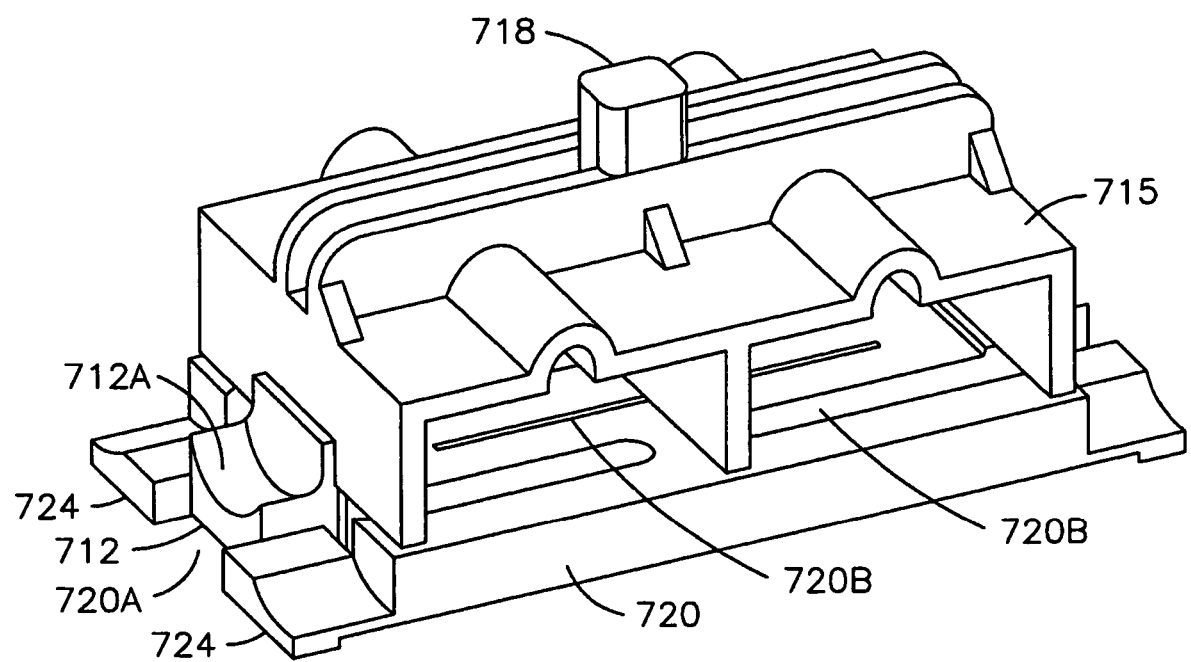

The support channel 715 overlies a lower insulation member 720 as illustrated in FIG. 34, with the superconducting blocks 106A and 106B omitted for clarity. As illustrated, a lower region of each tab 712 is received within a notch 720A in the lower insulation member 720, the notch formed between two successive extending fingers 724. The lower insulation member 720 is attached to the support channel 715 by, for example, a threaded bolt (not shown) passing through an opening in each tab 712 into a mating threaded opening in the lower insulation member 720. Thus the lower insulation member forms a bottom surface of the support channel 715 to secure the superconducting blocks 106A and 106B within the support channel 715.

Figure 35:
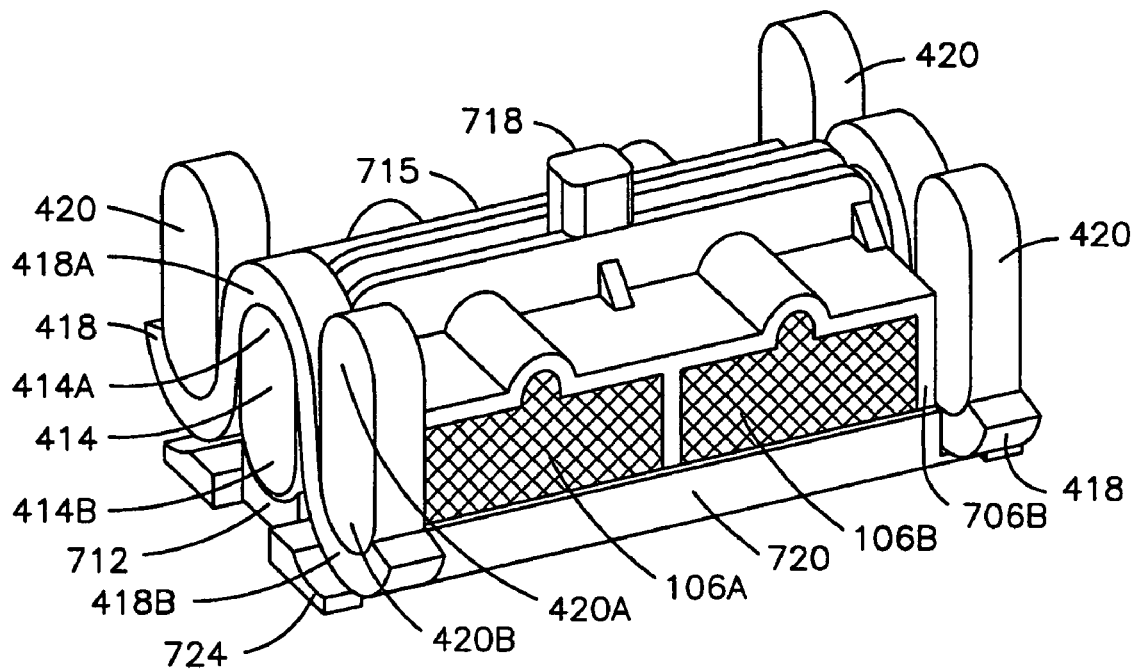

As illustrated in FIG. 35 a lower region 414A of the fiberglass reinforced plastic compression block 414 is supported within the arcuate upper surface 712A (see FIG. 34) of each tab 712. Only the left-side tab 712 and the corresponding compression block 414 are visible in FIG. 35.

The undulating frame 418 extends adjacent the left and right sidewalls 715B and 715C of the dual support channel 715 proximate or in contact with therewith. The upper arcuate segments 418A of the undulating frame 418 engage upper regions 414B of each compression block 414. The lower arcuate segments 418B of the frame 418 are received within arcuate depressions 724A in the laterally extending fingers 724 of the lower insulation member 720, as illustrated in FIGS. 35 and 36.

Figure 36:
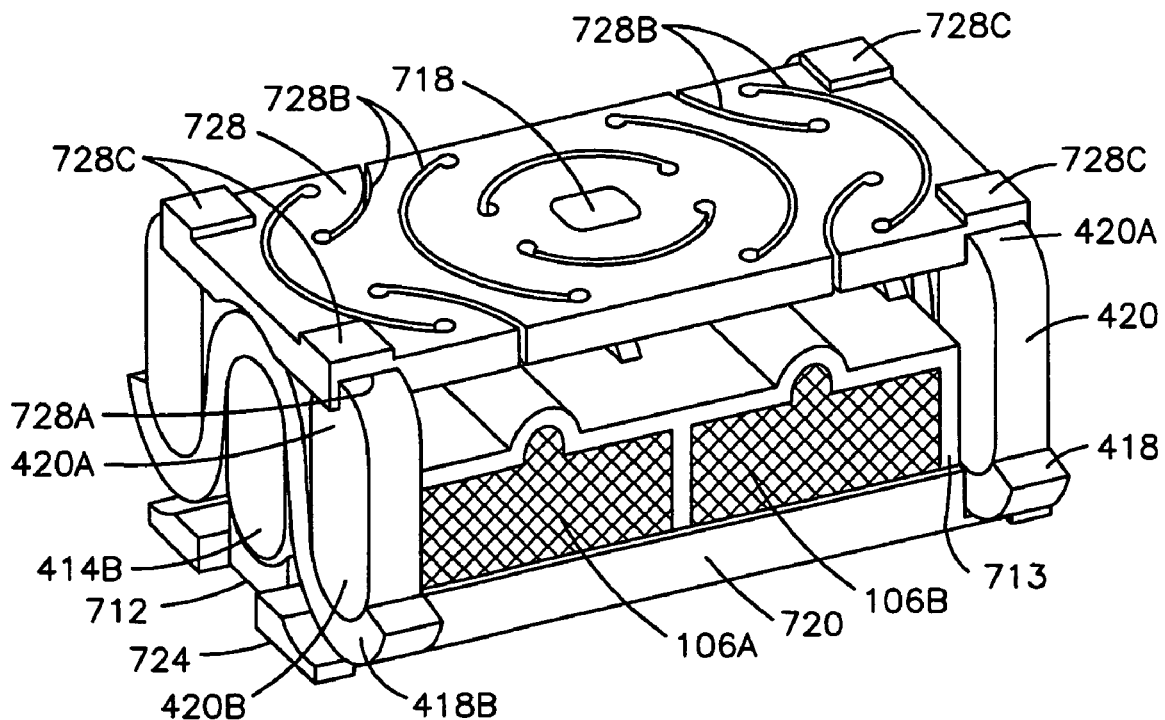

As further illustrated in FIGS. 35 and 36, the fiberglass reinforced plastic compression blocks 420 are captured between the lower curved segments 418B of the frame 418 and an upper insulation member 728. The upper insulation member 728 defines a plurality of recesses 728A in an underside surface and proximate lateral edge surfaces thereof for receiving the upper regions 420A of each compression block 420. The upper insulation member 728 also defines an opening therein for receiving the tab 718 as illustrated.

Figure 31B:
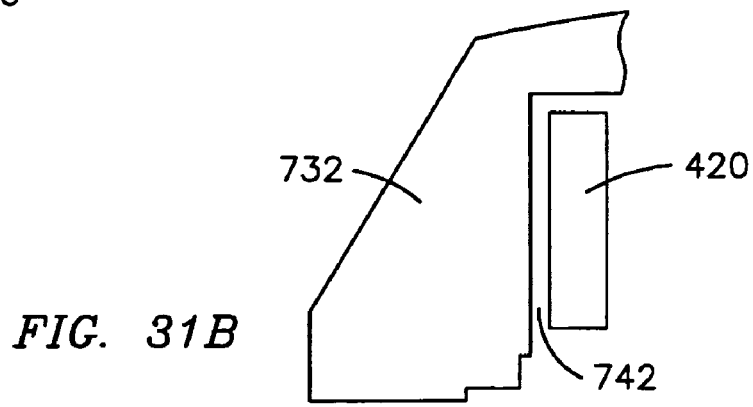

As illustrated in FIG. 31B a thermally insulating gap 742 is present between outer-facing sidewalls of the compression blocks 420 (and 414) and a proximate inside surface of the external casing 732.

Returning to FIG. 31A, an external casing 732 captures the elements of the coil support structure 700 and is fixedly attached to the rotor core 54 using bolts 436 for threadably engaging mating threads within the core 54.

Only the upper and lower insulation members 728 and 720 contact respective interior upper and lower surface regions of the external casing 732. The upper and lower insulation members 728 and 720 define respective gaps 728B and 720B (see FIGS. 34 and 36) (in one embodiment each gap having a width of about 2 to 5 mm) for determining thermal conductive paths therein. The illustrated shape and location of the gaps 728B and 7208B are merely exemplary. The gaps are configured to create a sufficiently long thermal conductive path for heat flow from the warm rotor core 54 through the external casing 732 to the upper and lower insulation members 720 and 728 in contact with the casing 732. Lengthening this heat flow path helps to maintain the cold temperature of the superconducting blocks 106A and 106B.

When the rotor of the superconducting generator is stopped or rotating at relatively low speeds (e.g. a turning gear speed), the superconducting blocks 106A and 106B are restrained within the support channel 715 by the lower insulation member 720. At operating high speeds the centrifugal loads exerted on the blocks 106A and 106B are transferred by the tabs 712 extending from the support channel sidewall surfaces 715B and 715C to the compression blocks 414 then to the compression blocks 420 through the frame 418. From the compression blocks 420 the load is transferred to the upper insulation member 728 to the external casing 732. Note that only peripheral regions 728C (see FIG. 36) contact interior surfaces of the casing 732.

Heat transfer from the rotor core 54 to the superconducting blocks 106A and 106B is impeded by the thermal insulating properties of the upper and lower insulation members 720 and 728, typically formed from an FRP material, and the gaps 720B and 728B formed therein.

The external ribs 736 (see FIG. 31A) of the external casing 732 provide support for both centrifugal and lateral loads imposed on the coil support structure 700 during operation and during fault conditions. A bottom plate 738 (see FIG. 31A) is affixed to a bottom surface of the external casing 732.

The fiberglass reinforced plastic compression blocks 414 and 420 are constructed to adapt to the thermal contraction of the support channel 715 at the low operating temperatures required to maintain the superconducting coils 106A and 106B in a superconducting state. The curved ends 414A/414B and 420A/420B of the blocks 414 and 420 (see FIGS.

35 and 36) allow the blocks to rotate about a block center, causing the curved ends 420B and 414A to slide along the respective lower and upper arcuate segments 418B and 418A of the frame 418, and the curved ends 420A and 414B to slide along the recesses 728A and 712A (see FIG. 34) so that the support channel 715 (including the superconducting blocks 106A and 106B therein) can contract axially relative to the fixed warm rotor core 54. The upper and lower insulation members 720 and 728 can also move axially relative to the rotor core 54 in response to contraction forces. The degree of rotation depends on the axial location of the blocks 414 and 420 on the rotor core 54, with a rotation angle of about zero degrees at a midpoint of the rotor's axis, with a maximum rotation angle at the rotor ends.

As in the embodiments described above, the casing 732 is rigidly restrained circumferentially on the core 54 between the affixed shear block and the removable shear block. A vacuum/magnetic shield 578 (see FIG. 14) surrounds the coil support structure 700 for drawing a vacuum within the shield 578.

The various described embodiments of the invention comprise components constructed from materials having a desired thermal resistance and mechanical configuration to support the superconducting conductors during operation of the electrical machine. During normal operation a length of the various thermal paths between the cold superconducting conductors and the warm rotor core are substantially maximized to limit heat flow along the path and thereby minimize conductor temperature increases. During transient conditions that can impose undesired mechanical loads on the conductors the thermal paths are altered (e.g., the path length is shortened as gaps between and within components tend to close) by these transient forces. Altering the thermal paths improves transference of the transient forces away from the conductors to the rotor core, at the expense of lowering the thermal resistance in the thermal paths during the transient event. Once the transient condition has subsided, the thermal paths return to their normal condition and the thermal resistance of the paths increases. Thus the thermal paths are formed to present a longer path for heat flow than the physical distance between the superconductors and the rotor, but the paths are shortened (e.g., gaps within the paths are closed) responsive to certain loads to provide additional load bearing and load transferring capabilities as required.

The components of the embodiments described in conjunction with FIGS. 9-13 and 31-36 impose compressive forces on the superconducting conductors to transfer the normal and transient forces to the rotor core via the casing affixed to the core and surrounding the conductors. The embodiments described in conjunction with FIGS. 14-22, 23 and 24-30 impose tension forces on the superconducting conductors, transferring the normal and transient forces to the casing and then to the core.

The mechanical components of each embodiment also permit movement of the superconducting conductors and proximate components relative to the rotor core, while maintaining structural integrity during both normal and transient operation. As the coolant lowers the conductor temperature the conductors and proximate components tend to contract relative to the warmer rotor. Thus movement responsive to the contractive forces is necessary to prevent conductor damage.

While the present invention has been described with reference to preferred embodiments, it will be understood by those skilled in the art that various changes may be made and equivalent elements may be substituted for the elements thereof without departing from the scope of the invention. The scope of the present invention further includes any combination of elements from the various embodiments set forth herein. In addition, modifications may be made to adapt a particular situation to the teachings of the present invention without departing from its essential scope. Therefore, it is intended that the invention not be limited to the particular embodiments disclosed, but that the invention will include all embodiments falling within the scope of the appended claims.

What is claimed is:

1. A structure for supporting superconducting conductors in a spaced-apart relation from a rotor core of an electrical machine, comprising:
   an enclosure comprising first and second opposing sidewalls and an upper surface enclosing the superconducting conductors;
   a casing attached to the core and comprising first and second opposing interior surfaces, the enclosure disposed within the casing;
   load transferring elements supported between the enclosure and the casing for transferring loads imposed on the superconducting conductors to the casing during operation of the electrical machine, wherein a first gap is defined in a first thermal path between the enclosure and the casing through the elements to impede heat flow from the rotor core to the superconducting conductors; and
   wherein the first gap is substantially open during normal operation of the electrical machine to lengthen the first thermal path and tends to close during an operating transient for the electrical machine.

2. The structure of claim 1 further comprising a lower insulation member forming a lower surface of the enclosure for supporting the superconducting conductors within the enclosure, regions of the lower insulation member in contact with the superconducting conductors and other regions in contact with the casing, the lower insulation member defining second gaps therein that define a second thermal path from the casing through the lower insulation member to the superconducting conductors, and wherein the second gaps are in an open state during normal operation of the electrical machine and tend toward a closed state during operating conditions that impose above-normal forces on the superconducting conductors, the second thermal path having a length greater than a distance between the conductors and the casing.

3. The structure of claim 2 wherein the regions in contact with the casing comprise fingers extending from sidewall surfaces of the lower insulation member and received within openings defined in the casing.

4. The structure of claim 1 wherein in response to contractive forces imposed on the enclosure the elements permit movement of the enclosure relative to the casing.

5. The structure of claim 1 further comprising an upper insulation member having regions in contact with an upper interior surface of the casing and other regions in contact with the upper surface of the enclosure, the upper insulation member defining second gaps therein that define a second thermal path through the upper insulation member between the casing and the enclosure, wherein the second gaps are in an open state during normal operation of the electrical machine and tend toward a closed state during operating conditions that impose above-normal forces on the superconducting conductors, and wherein the second thermal path has a length greater than a distance between the conductors and the casing.

6. The structure of claim 1 wherein the elements comprise a plurality of first compression blocks disposed proximate the first sidewall and a plurality of second compression blocks disposed proximate the second sidewall for transferring the loads from the enclosure to the casing.

7. The structure of claim 1 wherein the elements comprise a plurality of first tension bands disposed proximate the first sidewall and a plurality of second tension bands disposed proximate the second sidewall, each of the first and the second tension bands comprising an upper arcuate segment supported by the enclosure and a lower arcuate segment supported by the casing.

8. The structure of claim 1 wherein a material of the elements presents a thermal conductivity less than about 0.37 W/mK at about 77° K.

9. The structure of claim 1 wherein the casing comprises a closed structure for drawing a vacuum therein.

10. The structure of claim 1 wherein the electrical machine comprises an electric generator.

* * * * *

UNITED STATES PATENT AND TRADEMARK OFFICE
CERTIFICATE OF CORRECTION

PATENT NO. : 7,633,192 B2  Page 1 of 1
APPLICATION NO. : 11/529373
DATED : December 15, 2009
INVENTOR(S) : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 293 days.

Signed and Sealed this

Second Day of November, 2010

David J. Kappos
*Director of the United States Patent and Trademark Office*